US012350806B2

(12) United States Patent
Machida et al.

(10) Patent No.: US 12,350,806 B2
(45) Date of Patent: Jul. 8, 2025

(54) POWER TOOL HAVING A HAMMER MECHANISM

(71) Applicant: MAKITA CORPORATION, Anjo (JP)

(72) Inventors: Yoshitaka Machida, Anjo (JP); Yusuke Takano, Anjo (JP); Makoto Chikaraishi, Anjo (JP)

(73) Assignee: MAKITA CORPORATION, Anjo (JP)

(*) Notice: Subject to any disclaimer, the term of this patent is extended or adjusted under 35 U.S.C. 154(b) by 87 days.

(21) Appl. No.: 18/380,412

(22) Filed: Oct. 16, 2023

(65) Prior Publication Data

US 2024/0149423 A1 May 9, 2024

(30) Foreign Application Priority Data

Nov. 4, 2022 (JP) ................................ 2022-177511
Jun. 27, 2023 (JP) ................................ 2023-104866
Jun. 27, 2023 (JP) ................................ 2023-104867

(51) Int. Cl.
*B25D 17/20* (2006.01)
*B25D 16/00* (2006.01)

(52) U.S. Cl.
CPC ............ *B25D 17/20* (2013.01); *B25D 16/006* (2013.01); *B25D 2217/0061* (2013.01); *B25D 2217/0065* (2013.01)

(58) Field of Classification Search
CPC .................. B25D 17/20; B25D 16/006; B25D 2217/0061; B25D 2217/0065
See application file for complete search history.

(56) References Cited

U.S. PATENT DOCUMENTS 6,127,751 A 10/2000 Kristen et al.
6,851,898 B2 2/2005 Ege et al.
(Continued)

FOREIGN PATENT DOCUMENTS

JP 2006-334725 A 12/2006
JP 2013-013951 A 1/2013
(Continued)

OTHER PUBLICATIONS

U.S. Appl. No. 18/380,398, filed Oct. 16, 2023 in the name of Yoshitaka Machida et al.
(Continued)

*Primary Examiner* — Michelle Lopez
(74) *Attorney, Agent, or Firm* — Oliff PLC

(57) ABSTRACT

A power tool having a hammer mechanism, including: a connecting part connectable with a dust collector, and with a connection flow path to suck in the air from the dust collector to generate a suction power in the dust collector; a motor with a rotating shaft; a first fan to rotate with the rotating shaft and generate a first air flow to cool down the motor; a second fan to rotate with the first fan and generate a second air flow to generate the suction power; a housing with a first exhaust port to discharge the first air flow and a second exhaust port to discharge the second air flow; a first exhaust flow path to guide the first air flow to the first exhaust port; and a second exhaust flow path separated from the first exhaust flow path to guide the second air flow to the second exhaust port.

18 Claims, 22 Drawing Sheets

(56) References Cited

U.S. PATENT DOCUMENTS

| | | | | |
|---|---|---|---|---|
| 7,308,950 | B2 | 12/2007 | Faatz et al. | |
| 7,588,097 | B2 | 9/2009 | Kamegai et al. | |
| 7,705,497 | B2 | 4/2010 | Arich et al. | |
| 8,342,782 | B2 * | 1/2013 | Nishikawa | B23Q 11/006 173/198 |
| 8,876,932 | B2 * | 11/2014 | Machida | B23Q 11/0046 173/171 |
| 9,156,152 | B2 | 10/2015 | Machida | |
| 9,321,163 | B2 * | 4/2016 | Onoda | B25D 11/062 |
| 2003/0132016 | A1 | 7/2003 | Meixner et al. | |
| 2006/0272836 | A1 | 12/2006 | Hirayama et al. | |
| 2008/0210447 | A1 | 9/2008 | Robieu | |
| 2012/0273243 | A1 * | 11/2012 | Tada | B23Q 11/0046 173/198 |
| 2013/0000937 | A1 | 1/2013 | Onoda et al. | |
| 2018/0345469 | A1 | 12/2018 | Tanabe et al. | |
| 2019/0314971 | A1 * | 10/2019 | Yoshikane | B25D 11/125 |
| 2020/0078919 | A1 | 3/2020 | Machida et al. | |
| 2022/0258320 | A1 | 8/2022 | Machida et al. | |
| 2022/0388106 | A1 | 12/2022 | Yoshikane et al. | |
| 2023/0415323 | A1 | 12/2023 | Ichikawa et al. | |

FOREIGN PATENT DOCUMENTS

| | | |
|---|---|---|
| JP | 2019-181605 A | 10/2019 |
| JP | 2020-040161 A | 3/2020 |
| JP | 2022-185909 A | 12/2022 |

OTHER PUBLICATIONS

U.S. Appl. No. 18/380,429, filed Oct. 16, 2023 in the name of Yoshitaka Machida et al.

Nov. 27, 2024 Office Action issued in U.S. Appl. No. 18/380,429.

Nov. 1, 2024 Office Action issued in U.S. Appl. No. 18/380,398.

Apr. 11, 2025 U.S. Office Action issued in U.S. Appl. No. 18/380,398.

* cited by examiner

POWER TOOL HAVING A HAMMER MECHANISM

CROSS-REFERENCE TO RELATED APPLICATION

The present application claims priority to Japanese patent applications No. 2022-177511 filed on Nov. 4, 2022, No. 2023-104866 filed on Jun. 27, 2023, and No. 2023-104867 filed on Jun. 27, 2023. The contents of the foregoing applications are hereby incorporated by reference in their entirety.

TECHNICAL FIELD

The technique of the present disclosure relates to a power tool having a hammer mechanism.

BACKGROUND

The power tool having a hammer mechanism is configured to move a tip tool back and forth by means of a motor and thereby strike an object material to be processed. For example, JP2022-185909A (hereinafter may be referred to as "Patent Literature 1") discloses a hammer drill that is one example of the power tool.

Like the hammer drill disclosed in Patent Literature 1, a dust collector configured to suck the dust generated in the course of a processing operation may be attached to the power tool. The hammer drill disclosed in Patent Literature 1 uses two fans connected with the motor to generate an air flow for cooling down a motor and an air flow for generating the suction power in the dust collector, in a housing.

SUMMARY

The hammer drill disclosed in Patent Literature 1 joins the air flow used for cooling down the motor with the air flow taken in from the dust collector and discharges the joined air flows from a common exhaust port. This configuration is, however, likely to cause a pressure loss by collision of the two air flows and decrease the flow velocities of the respective air flows. This may affect the performance of cooling down the motor and the dust collection performance of the dust collector.

One object of the technique of the present disclosure is to suppress reduction of the performance in a housing of a power tool caused by a pressure loss of an air flow serving to cool down a motor and a pressure loss of an air flow serving to generate a suction power of a dust collector.

According to one aspect of the present disclosure, there is provided a power tool having a hammer mechanism. The power tool of this aspect includes a tool mounting portion, a connecting part, a motor, a driving mechanism, a first fan, a second fan, a housing, a first exhaust flow path, and a second exhaust flow path. A tip tool is mounted to the tool mounting portion. The connecting part is configured to be connectable with a dust collector that is configured to suck dust generated during processing of an object material to be processed by using the tip tool, and provided with a connection flow path configured to suck in the air from the dust collector, so as to generate a suction power in the dust collector. The motor has a rotating shaft. The driving mechanism is connected with a first end part of the rotating shaft and configured to convert a rotational motion of the rotating shaft into a reciprocating motion and transmit the reciprocating motion to the tip tool. The first fan is connected with a second end part of the rotating shaft and configured to rotate with the rotating shaft and blow the air in a centrifugal direction, so as to generate a first air flow that serves to cool down the motor. The second fan is stacked on the first fan via a middle wall portion in an axial direction of the rotating shaft and configured to rotate with the first fan and blow the air in the centrifugal direction, so as to generate a second air flow that serves to generate the suction power. The housing is provided with a first exhaust port configured to discharge the first air flow therethrough and a second exhaust port configured to discharge the second air flow therethrough. The first exhaust flow path is configured to guide the first air flow to the first exhaust port. The second exhaust flow path is separated from the first exhaust flow path and configured to guide the second air flow to the second exhaust port.

According to the power tool of this aspect, the first air flow and the second air flow are guided through the separate exhaust flow paths to the corresponding exhaust ports and thereby the air flows suppress from interfering with each other to cause a pressure loss. This configuration accordingly suppresses reduction of the effect of cooling down the motor by the first air flow and reduction of the suction power of the dust collector by the second air flow.

DETAILED DESCRIPTION OF THE EMBODIMENTS

Figure 1:
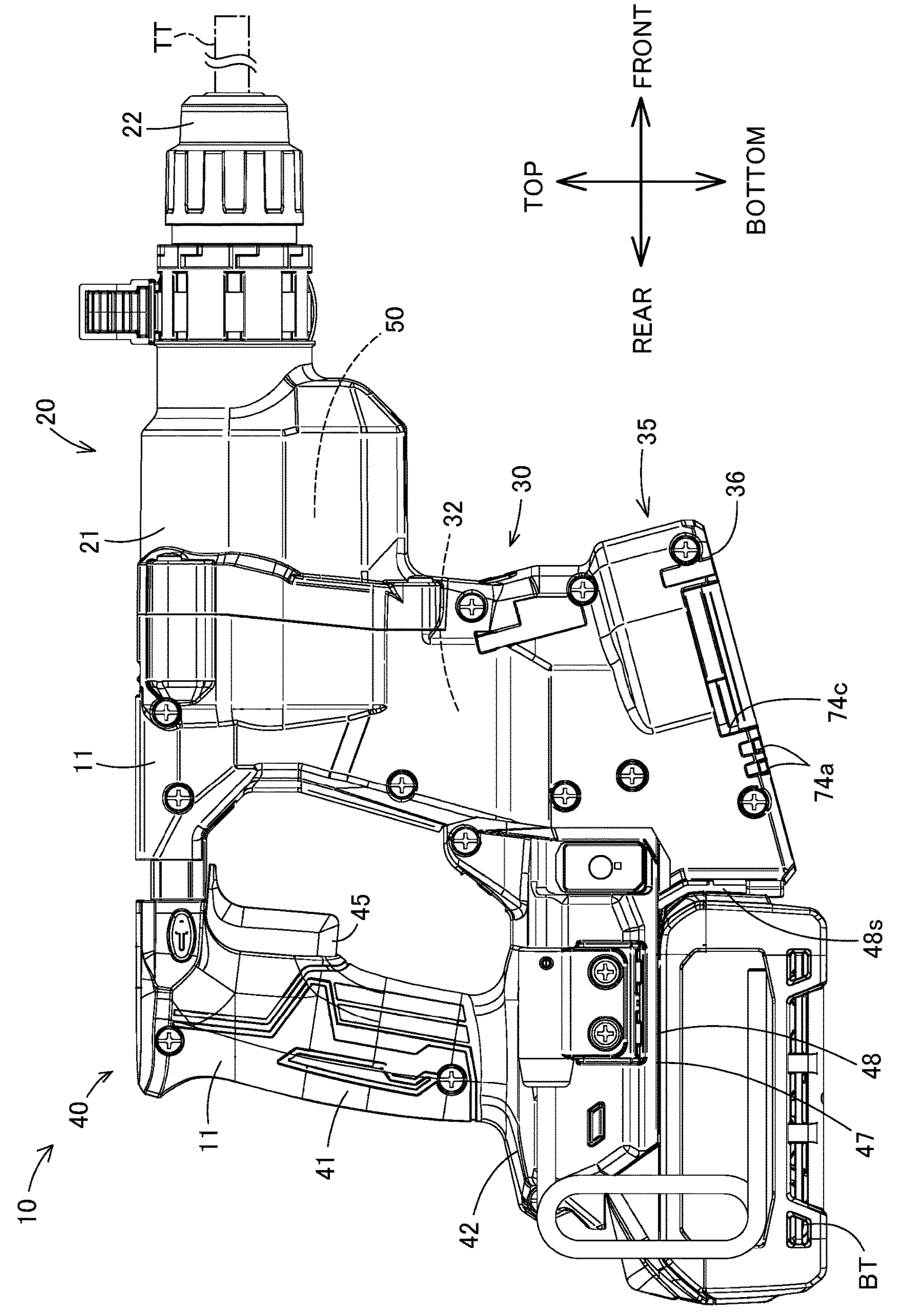
FIG. 1 is a schematic side view illustrating a power tool having a hammer mechanism.

In one or more aspects of the present disclosure, the power tool described above may further comprise a baffle plate placed at a position on an opposite side to the first fan across the second fan to be laid in the axial direction of the rotating shaft and configured to rectify the air flow blown in the centrifugal direction by the second fan. Part of the baffle plate may form a partition wall that separates the first exhaust flow path and the second exhaust flow path from each other. According to the power tool of this configuration, part of the baffle plate is used to form the exhaust flow paths of the first air flow and of the second air flow. This accordingly enable to reduce the total number of components for the power tool.

In one or more aspects of the present disclosure, the baffle plate may include a side wall portion that is extended in the axial direction of the rotating shaft on a lateral side of the second fan. The side wall portion may include a first wall surface arranged to face the first exhaust flow path, along with an inner wall surface of the housing; and a second wall surface arranged to face the second exhaust flow path, along with the inner wall surface of the housing. According to the power tool of this configuration, the side wall portion of the baffle plate enables the first exhaust flow path and the second exhaust flow path that are separated from each other to be readily formed on the lateral side of the second fan compactly together.

In one or more aspects of the present disclosure, the baffle plate may include a center plate portion arranged to intersect with a center axis of the second fan and placed along the centrifugal direction of the second fan. The center plate portion may include a first part that is a continuous part having an end portion thereof located on an outer side of an end portion of the second fan in the centrifugal direction of the second fan, and a second part having an end portion thereof located at a position closer to the center axis of the second fan than the end portion of the first part. According to the power tool of this configuration, the second part lowers the flow resistance of the second exhaust flow path which the second air flow generated by the second fan flows therein. This configuration accordingly suppresses reduction of the flow velocity of the second air flow and enhances the suction power of the dust collector.

In one or more aspects of the present disclosure, the side wall portion may be formed on an opposite side to the second part across the center axis of the second fan in the centrifugal direction of the second fan. According to the power tool of this configuration, the second air flow generated by the second fan enables be separated from the first air flow that flows along the side wall portion. This configuration accordingly furthermore suppresses the first air flow and the second air flow from interfering with each other.

In one or more aspects of the present disclosure, the second exhaust port may be provided at a position facing the baffle plate, and a rib configured to divide the second exhaust port into a plurality of areas may be formed on a second exhaust port-side face of the baffle plate. According to the power tool of this configuration, the rib provided on the baffle plate smoothens the exhaust of the second air flow from the second exhaust port and thereby reduces a pressure loss of the second air flow at the second exhaust port. The rib also suppresses invasion of foreign substances into the second exhaust port. This allows for a large opening area of the second exhaust port and thereby further reduces a pressure loss of the second air flow at the second exhaust port. Accordingly, this configuration furthermore suppresses reduction of the suction power of the dust collector caused by a pressure loss of the second air flow.

In one or more aspects of the technique of the present disclosure, the first fan and the second fan may have configurations different from each other. According to the power tool of this configuration, the first fan may be configured to be more suitable for generation of the first air flow that serves to cool down the motor, and the second fan may be configured to be more suitable for generation of the second air flow that serves to collect the dust. This configuration accordingly further enhances the effect of cooling down the motor by the first fan and the effect of dust collection by the second fan.

In one or more aspects of the technique of the present disclosure, the first fan may be provided with a plurality of fins on a motor-side face thereof and may be configured to take in the air from a motor side in a direction of the rotating shaft and blow the air in the centrifugal direction, and the second fan may be provided with an air inlet port provided in a center portion thereof and with a plurality of fins arranged around the intake port and configured to the air, which is taken in through the inlet port, in the centrifugal direction. According to the power tool of this configuration, the two different types of fans having different configurations enable to generate the first air flow and the second air flow efficiently.

In one or more aspects of the technique of the present disclosure, the middle wall portion may be provided with a circular flange portion arranged around an outer circumferential part of the middle wall portion and protruded in the centrifugal direction more than an outer circumferential end of the first fan and an outer circumferential end of the second fan. According to the power tool of this configuration, the flange portion suppresses the first air flow generated from the first fan and the second air flow generated from the second fan from interfering with each other. This configuration accordingly furthermore suppresses the occurrence of a pressure loss caused by the interference of the first air flow with the second air flow.

In one or more aspects of the technique of the present disclosure, the first exhaust port and the second exhaust port may be arranged together in an end part of the housing in a direction from the first end part of the rotating shaft toward the second end part of the rotating shaft and may be configured to discharge at least part of the first air flow and the second air flow in an identical direction. According to the power tool of this configuration, the exhaust ports are collectively provided at a position apart from the tip tool and thereby suppresses the dust from being kicked up by the exhaust and interfering with a processing operation.

In one or more aspects of the technique of the present disclosure, at least one of the first exhaust port and the second exhaust port may be configured to discharge the air in a plurality of directions. According to the power tool of this configuration, the flow rate of the air discharged from the exhaust ports can be increased. Thereby, at least one of the performance of cooling down the motor by the first air flow and the suction performance of the dust collector by the second air flow can be improved.

A non-limiting, representative embodiments according to the present disclosure are specifically described below with reference to the drawings.

1. Embodiment

1-1. General Configuration of Power Tool

The general configuration of a power tool 10, which has a hammer mechanism according to an embodiment is described first with reference to FIG. 1 to FIG. 4. As a matter of convenience, a tip tool TT is illustrated by one-dot chain line in FIG. 1. FIG. 1 illustrates the state that one example of a battery BT is attached to the power tool 10, whereas the illustration of the battery BT is omitted in FIG. 3 and FIG. 4.

Arrows indicating a "front-rear direction", a "top-bottom direction" and a "left-right direction" that are directions relating to the power tool 10 and that are defined for the convenience of description in the specification hereof. The "front-rear direction" is a direction where the tip tool TT of the power tool 10 is moved back and forth. The side which the tip tool TT is protruded to is "front" side, and the side which the tip tool TT is drawn back to is "rear" side. The front-rear direction corresponds to a length direction of the power tool 10. The "top-bottom direction" is a direction perpendicular to the front-rear direction. A side where the tip tool TT is placed is "top" or "upper" side, and a side where a motor 32 is placed is "bottom" or "lower" side. The top-bottom direction corresponds to a height direction of the power tool 10. The "left-right direction" is a direction perpendicular to the front-rear direction and the top-bottom direction and corresponds to a width direction of the power tool 10. The arrows indicating the "front-rear direction", the "top-bottom direction" and the "left-right direction" are appropriately illustrated in respective drawings that are referred to later in the specification hereof.

The power tool 10 shown in FIG. 1 to FIG. 4 is one type of handheld power tool and is configured to reciprocate the tip tool TT by the driving force of the motor 32 and thereby strike a non-illustrated object material to be processed. The power tool 10 according to the embodiment is a sort of hammer drill and enables the tip tool TT to be rotated and driven about a center axis thereof. A power tool system 200 is configured by attaching a dust collector 100 that is configured to suck the dust generated in the course of processing of the object material by the tip tool TT, to the power tool 10 of the embodiment as described later in detail. The configurations of the dust collector 100 and the power tool system 200 will be described after description of the configuration of the power tool 10.

Figure 4:
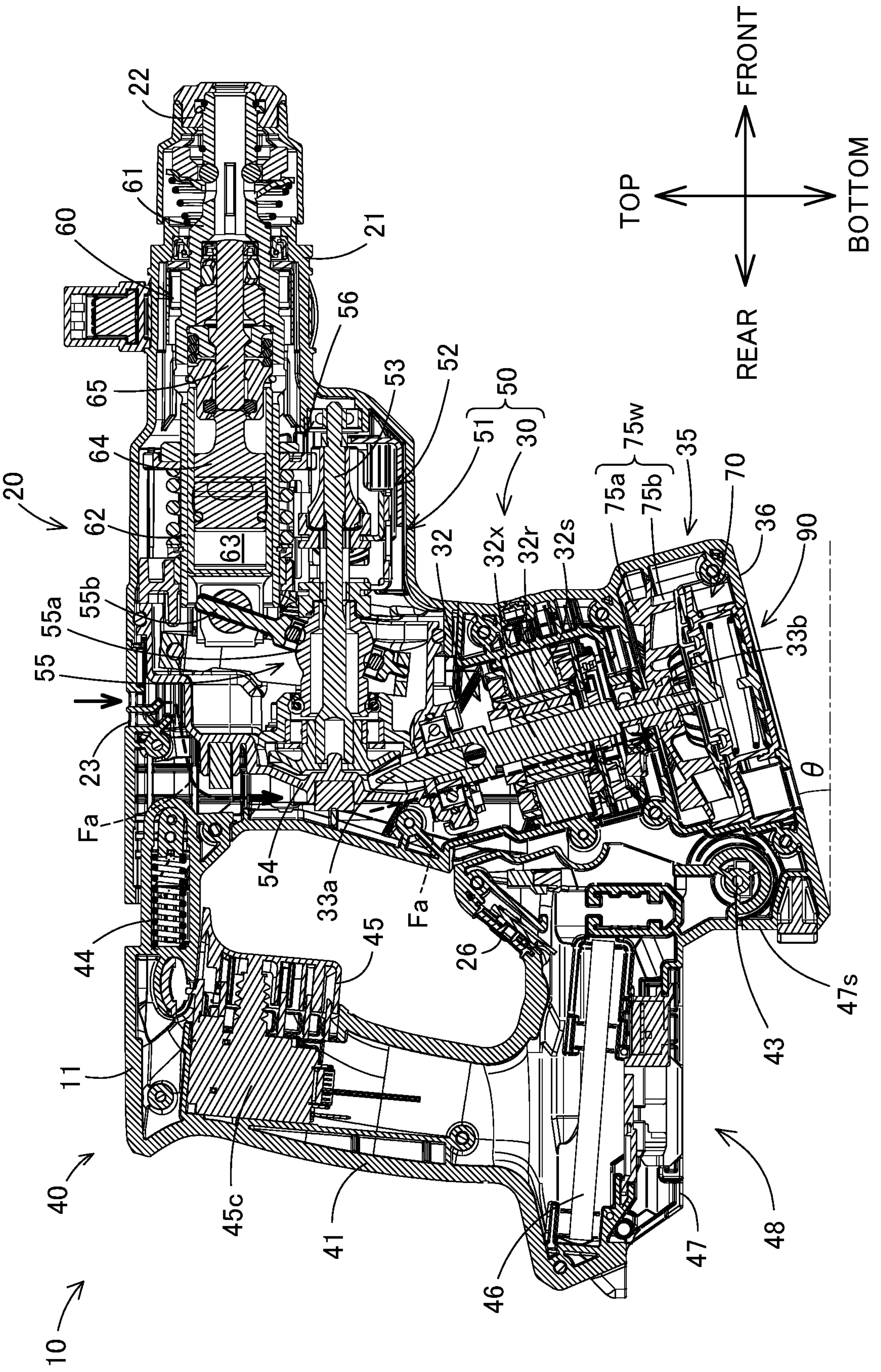
FIG. 4 is a schematic sectional view illustrating the power tool, taken along a line 4-4 shown in FIG. 2.

As shown in FIG. 1 and FIG. 4, the power tool 10 is provided with a housing 11 that internally has a space which internal machine elements are placed in. The housing 11 configures an outer shell of respective components of the power tool 10 described below.

Referring to FIG. 1, the power tool 10 includes a front main body 20 and a rear main body 40. The tip tool TT is attached to the front main body 20 and drive unit 50 serving to drive the tip tool TT is placed in the front main body 20. The rear main body 40 connects with a rear end part of the front main body 20. A battery BT is attached to a lower end of the rear main body 40.

The front main body 20 is described first. The front main body 20 includes a tool holding portion 21 and a motor housing portion 30. The tool holding portion 21 is located at an upper end of the power tool 10 and extended in the front-rear direction. The motor housing portion 30 is extended downward from a rear end side of the tool holding portion 21.

The tool holding portion 21 includes a tool mounting portion 22 provided at a front end thereof and configured to allow the tip tool TT called a bit to be detachably attached to. Various types of tip tools TT are provided corresponding to various processing works, and the tip tool TT is appropriately replaceable. A driving mechanism 51 serving to drive the tip tool TT is placed inside of the tool housing portion 21 as shown in FIG. 4. The driving mechanism 51 will be described later.

Figure 2:
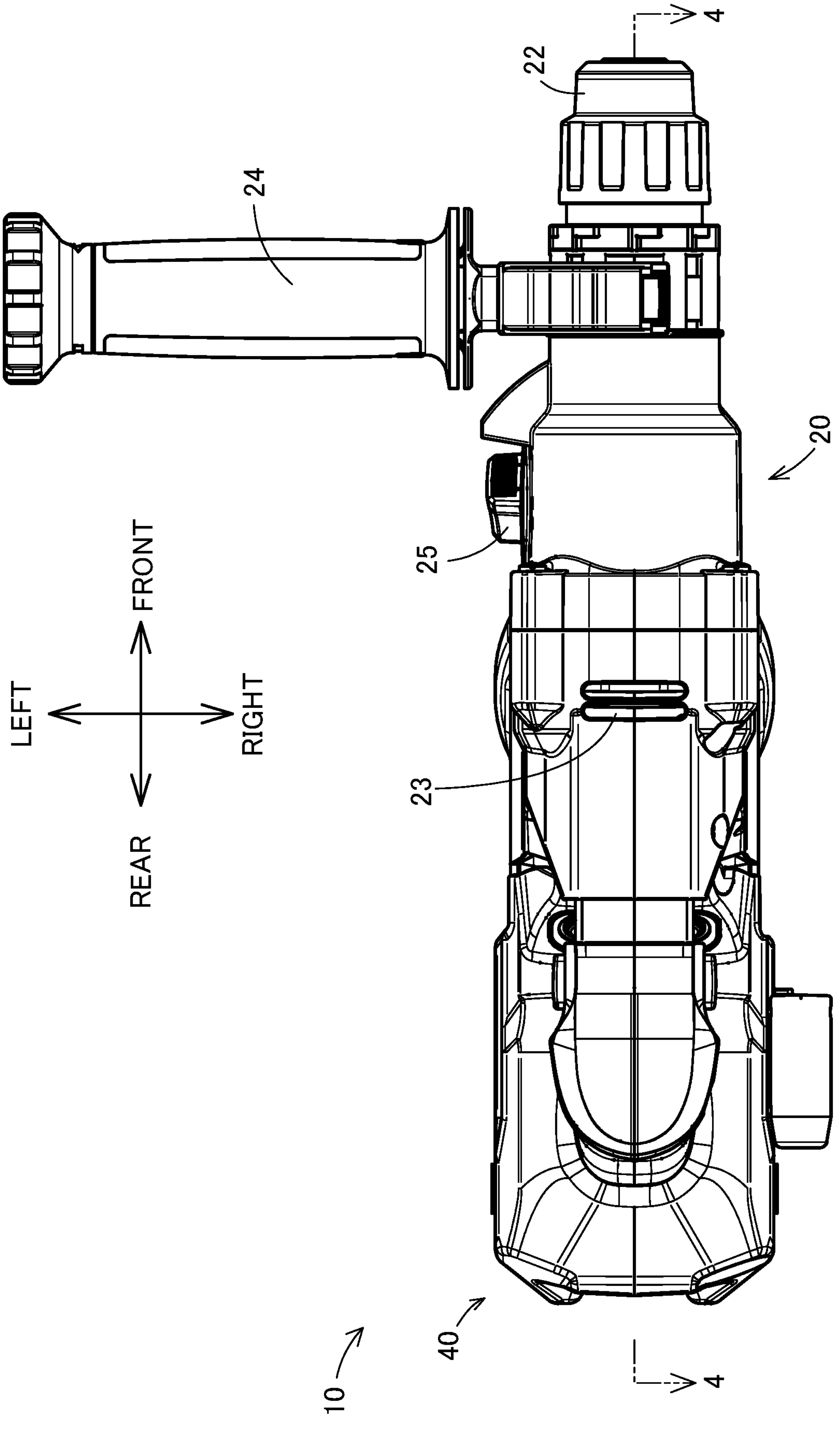
FIG. 2 is a schematic top view illustrating the power tool.

Referring to FIG. 2, an upper face intake port 23 is provided on an upper face of the housing 11 that configures the tool holding portion 21, to take in the outer air for cooling down the motor 32. The configuration of cooling down the motor 32 will be described later.

A side handle 24 is provided on a side face of the tool holding portion 21 to be protruded therefrom and to be held by a user. A mounting position of the side handle 24 is configured to be variable around a drive shaft of the tip tool TT. The side handle 24 is configured to be detachable.

A dial operation unit 25 is provided on the side face of the tool holding portion 21 to change over a drive mode of the power tool 10. The drive modes provided include, for example, a hammer mode that only reciprocates the tip tool TT, a hammer drill mode that reciprocates and rotates the tip tool TT, and a drill mode that only rotates the tip tool TT.

Referring to FIG. 4, the motor 32 is placed in the motor housing portion 30 as described above. The motor 32 is configured to generate the rotational driving force for driving the tip tool TT. The motor 32 includes a rotating shaft **32*x* of rotating and driving, a rotor 32*r* integrated with the rotating shaft 32*x*, and a stator 32*s* provided on an outer periphery of the rotor 32*r***.

The rotating shaft **32*x* is placed in an orientation intersecting with the front-rear direction. According to the embodiment, the rotating shaft 32*x* is place in an orientation obliquely intersecting with the front-rear direction. This configuration reduces the height of the housing 11 that configures the motor housing portion 30 and enables downsizing of the power tool 10, compared with a configuration that places the rotating shaft 32*x* of the motor 32** at an angle perpendicular to the front-rear direction.

A first end part **33*a* that is an upper end part of the rotating shaft 32*x* is connected with the driving mechanism 51. A second end part 33*b* that is a lower end part is connected with fans 75*a* and 75*b*. An air flow generator 70 is provided in the motor housing portion 30 to generate the air flow in the housing 11 by means of the fans 75*a* and 75*b*. The detailed configuration of the air flow generator 70** will be described later.

The motor housing portion 30 includes a lower end part 35 that configures a bottom face of the rear main body 40 and that is protruded downward more than a rear bottom face 47 located on a rear side of the motor housing portion 30. The lower end part 35 is a portion located at a lowermost end of the power tool 10. Main part of the air flow generator 70 described above is placed in the lower end part 35. The lower end part 35 has an inclined bottom face 36 that is inclined relative to the front-rear direction and faces the front side.

Figure 3:
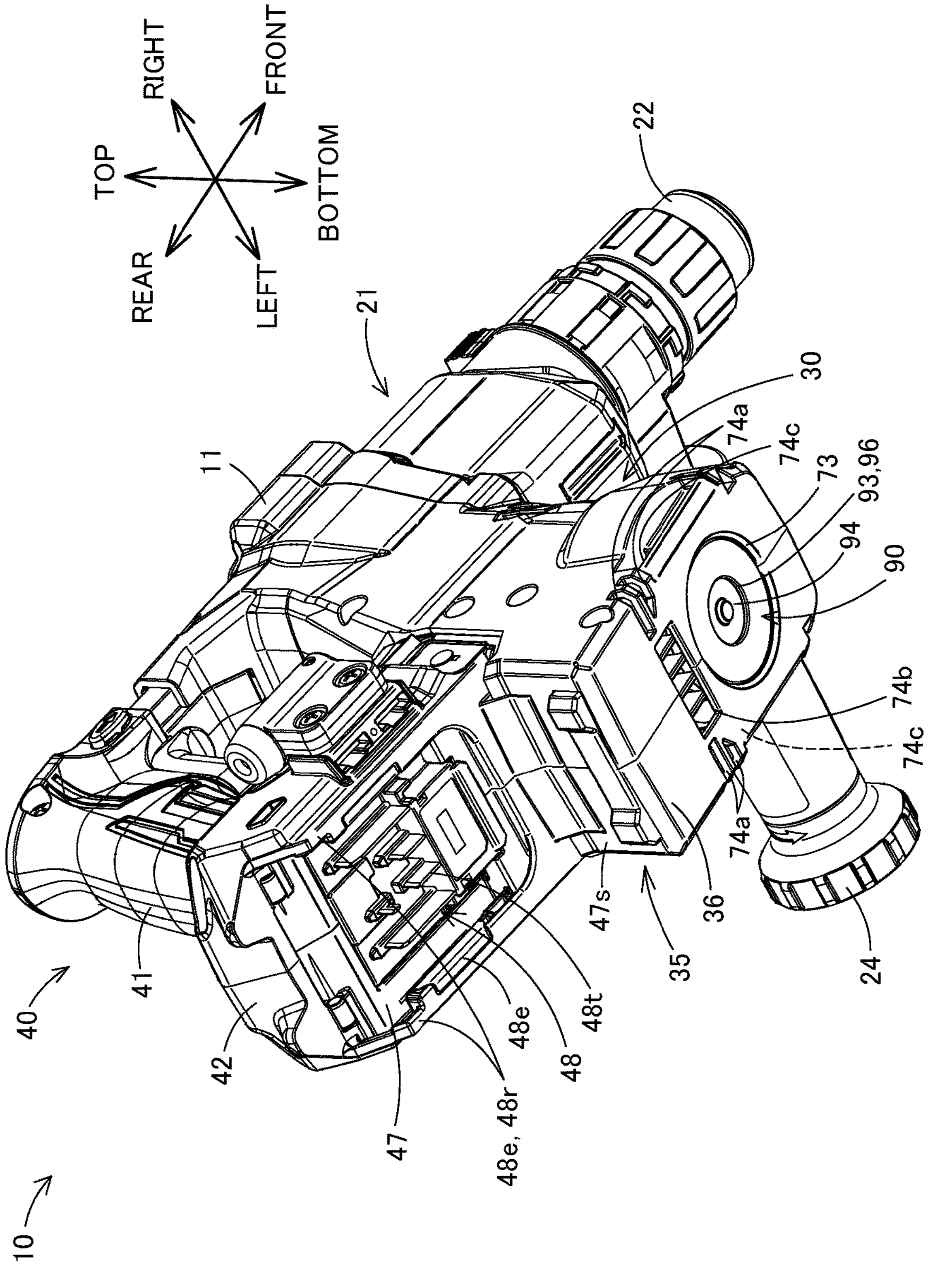
FIG. 3 is a schematic perspective view illustrating the power tool viewed from obliquely below.

According to the embodiment, as shown in FIG. 3, a connecting part 90 which the dust collector 100 is to connects with is provided on the inclined bottom face 36.

The configuration of the connecting part 90 will be described later, along with the configuration of the air flow generator 70.

According to the embodiment, an angle of inclination θ of the inclined bottom face 36 relative to the front-rear direction is preferably not less than 10 degrees and not greater than 45 degrees. The angle of inclination θ is more preferably not greater than 30 degrees. The angle of inclination θ may be approximately 15 degrees. The reason of inclination of the inclined bottom face 36 will be described later.

The rear main body 40 is described next with reference to FIG. 1. The rear main body 40 includes a grip portion 41 to be held by the user and a controller housing portion 42 provided on a lower side of the grip portion 41.

In the rear main body 40, an upper end part of the grip portion 41 is connected with a rear end part of the tool holding portion 21, and a front end part of the controller housing portion 42 is connected with a rear end part of the motor housing portion 30. A space that allows the user to insert a finger therein is formed between the grip portion 41 and the tool holding portion 21.

Referring to FIG. 4, the rear main body 40 connects with the front main body 20 with allowing for only a slight rotation thereof around a supporting point that is a pivotal rotation axis 43 provided at a lower rear end of the motor housing portion 30. An elastic member 44 is placed in a joint part of the grip portion 41 and the tool holding portion 21. Although not being explained in detail, the power tool 10 is configured, such that the vibration generated in the tool holding portion 21 in the course of a processing operation is absorbed by the elastic member 44 and an elastic material placed around the pivotal rotation axis 43 and thereby the vibration transmitted to the grip portion 41 is reduced.

Referring to FIG. 1 and FIG. 4, a trigger 45 is provided on a front side face of the grip portion 41 to drive on and off the motor 32. A switch circuit 45*c* is placed behind or on a rear side of the trigger 45. The switch circuit 45*c* outputs a signal indicating a command for driving on and off the motor 32 to a controller 46, in response to an operation of the trigger 45.

Referring to FIG. 4, the controller 46 is placed in the controller housing portion 42. The controller 46 is configured by a microcomputer including at least a central processing unit (CPU) and a main storage unit (RAM). The controller 46 has various functions for controlling the operations of the entire power tool 10. For example, the controller 46 controls the electric power that is to be supplied from the battery BT to the motor 32, based on the user's operation and the results of detection of sensors, so as to control driving the motor 32. The controller 46 controls a start and a stop of driving the motor 32, in response to a signal from the switch circuit 45*c* that is generated corresponding to the user's operation of the trigger 45. The controller 46 also controls the rotation speed of the motor 32, based on the user's operation of a button-type change speed switch 26 that is provided on a front upper face of the controller housing portion 42 and that is operated to give a command for acceleration or deceleration.

Referring to FIG. 1 and FIG. 3, a battery mounting portion 48, which the battery BT serving as a power source of the power tool 10 is mounted on, is provided on a rear bottom face 47 that is a bottom face of the rear main body 40 and that is also a bottom face of the controller housing portion 42. A step portion 47*s* is formed between the rear bottom face 47 and the inclined bottom face 36 of the front main body 20 described above. The battery BT is placed in an area that faces the rear bottom face 47 and the step portion 47*s*.

Referring to FIG. 3, the battery mounting portion 48 includes a connection terminal 48*t* and an engagement element 48*e*. The connection terminal 48*t* is electrically connected with a terminal provided on an upper face of the battery BT. The engagement element 48*e* is engaged with an engaging element provided on the upper face of the battery BT to hold the battery BT. The battery BT has an approximately rectangular shape and has a connecting portion corresponding to the battery mounting portion 48. Various different types of batteries BT having different external dimensions and different charging capacities are mountable to the battery mounting portion 48.

According to the embodiment, the battery mounting portion 48 is configured, such that the battery BT is slid forward toward the lower end part 35 of the motor housing portion 30, so as to be mounted to the battery mounting portion 48. The engagement element 48*e* includes a pair of guide rails 48*r* that are extended in the front-rear direction and that are arrayed parallel to each other in the left-right direction. The pair of guide rails 48*r* are engaged with a pair of linear grooves provided as the engaging element on the upper face of the battery BT.

The battery mounting portion 48 is also provided with a latch mechanism that serves to automatically fix the battery BT when the battery BT reaches a predetermined mounting position. The latch mechanism is known technology, so that detailed description of the latch mechanism is omitted herein.

1-2. Inclined Bottom Face

Figure 5:
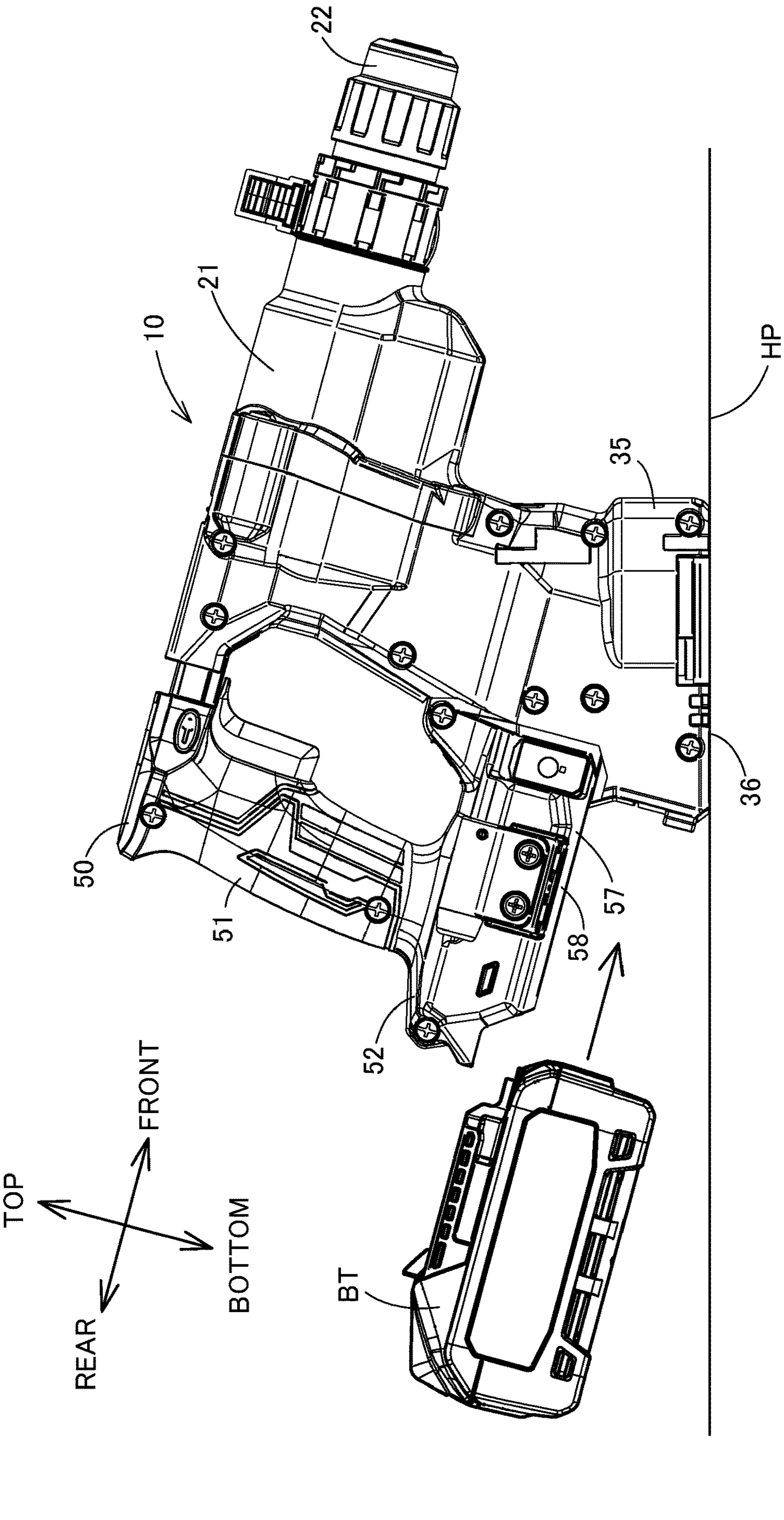
FIG. 5 is a schematic diagram illustrating a process of mounting a battery to the power tool.

FIG. 5 illustrates the state that the power tool 10 is placed on a horizontal plane HP with the inclined bottom face 36 thereof serving as a supporting surface. As shown in FIG. 5, in the state that the power tool 10 is placed on the horizontal plane HP with the inclined bottom face 36 as the supporting surface, the rear main body 40 is lifted up. This state facilitates mounting of the battery BT to the battery mounting portion 48 of the rear bottom face 47 of the rear main body 40. The configuration of sliding and moving the battery BT in the front-rear direction to mount the battery BT to the battery mounting portion 48, like the configuration of this embodiment, further facilitates the mounting operation of the battery BT.

According to the embodiment, the power tool 10 is configured such as to be stably placed on the horizontal plane HP with the inclined bottom face 36 as the supporting surface in the state that neither the tip tool TT nor the battery BT is mounted to the power tool 10, by adjusting, for example, the area of the inclined bottom face 36 and the position of the center of gravity. It is preferable that the power tool 10 is configured to be stably placed on the horizontal plane HP with the inclined bottom face 36 as the supporting surface even in the state that the tip tool TT is mounted to the power tool 10 but the battery BT is not mounted to the power tool 10.

This configuration enables the power tool 10 to be stably placed on the horizontal plane HP with the inclined bottom face 36 as the supporting surface, without requiring the user to hold or support the power tool 10. This configuration accordingly furthermore facilitates the mounting operation of the battery BT. Moreover, the power tool 10 is in such an orientation that the grip portion 41 is lifted up obliquely when the power tool 10 is placed on the horizontal plane HP. This enables the user to readily hold the grip portion 41 and lift up the power tool 10 placed on the horizontal plane HP. This configuration accordingly enhances the ease of handling and the usability of the power tool 10.

Referring to FIG. 1, it is preferable that the power tool 10 is configured to be stably placed on the horizontal plane HP in the state that the battery BT is mounted to the power tool 10. In this configuration, the power tool 10 is placed in a stable attitude on the horizontal plane HP with the inclined bottom face 36 as the supporting surface in the case that the height of the battery BT is equal to or smaller than the height of the step portion 47*s* between the rear bottom face 47 and the inclined bottom face 36. Also, in the case that the height of the battery BT is larger than the height of the step portion 47*s* between the rear bottom face 47 and the inclined bottom face 36, the power tool 10 is supported by a front end part of the inclined bottom face 36 and a front end part of the battery BT and to be placed in a stable attitude on the horizontal plane HP.

This configuration enables the user to readily place the power tool 10 on the horizontal plane HP in the course of an operation using the power tool 10. When the user resumes the operation using the power tool 10, this configuration enables the user to readily hold the grip portion 41 lifted obliquely upward from the horizontal plane and lift up the power tool 10. This configuration accordingly enhances the ease of handling and the usability of the power tool 10.

Referring to FIG. 4, the inclined bottom face 36 is orthogonal to an axial direction of the rotating shaft 32*x* of the motor 32 according to the embodiment. This configuration decreases a dead space in an area surrounding the second end part 33*b* of the rotating shaft 32*x* inside of the housing 11. This configuration accordingly improves the space efficiency of the power tool 10 in the housing 11 and enables downsizing of the power tool 10.

As described above, the inclined bottom face 36 is provide with the connecting part 90 serving to connect the power tool 10 with the dust collector 100. This configuration enables a space for placing therein a dust collector-side connecting part 142 described later to be formed under the inclined bottom face 36 when the power tool 10 is placed in such an attitude that the front-rear direction thereof is made horizontal. This configuration accordingly suppresses an increase in the height dimension when the power tool 10 is integrated with the dust collector 100.

1-3. Drive Unit

Referring to FIG. 4, the following describes the drive unit 50 placed in the front main body 20 and configured to drive the tip tool TT.

The drive unit 50 includes the motor 32 described above, and the driving mechanism 51 configured to drive the tip tool TT by means of the driving force generated by the motor 32. The driving mechanism 51 includes a driving force transmission mechanism 52 connected with the rotating shaft 32*x* of the motor 32, and a tool driving mechanism 60 configured to mediate the connection between the driving force transmission mechanism 52 with the tip tool TT and generate motions of the tip tool TT.

The driving force transmission mechanism 52 serves to convert a rotational motion of the rotating shaft 32*x* of the motor 32 into a linear motion in the front-rear direction and transmit the converted linear motion to the tool driving mechanism 60 in the hammer mode and in the hammer drill mode. According to the embodiment, the driving force transmission mechanism 52 also serves to transmit the rotational motion of the rotating shaft 32*x* of the motor 32 to the tool driving mechanism 60 without conversion in the hammer drill mode and in the drill mode.

The power tool 10 is provided with a mechanism of blocking the transmission of the linear motion or the rotational motion from the driving force transmission mechanism 52 to the tool driving mechanism 60, in response to an operation of the dial operation unit 25 to switch the drive mode. This mechanism is known technology, so that detailed description of this mechanism is omitted herein.

The driving force transmission mechanism 52 includes an intermediate rotating shaft 53 that is held parallel to the front-rear direction in a rotatable state about a center axis thereof, and a bevel gear 54 connected with a rear end part of the intermediate rotating shaft 53. The first end part 33*a* of the rotating shaft 32*x* of the motor 32 connects with the rear end part of the intermediate rotating shaft 53 via the bevel gear 54. This configuration causes the intermediate rotating shaft 53 to rotate with rotation of the rotating shaft 32*x* of the motor 32.

The driving force transmission mechanism 52 further includes a swinging member 55 configured to convert a rotational motion of the intermediate rotating shaft 53 into a reciprocating motion in the front-rear direction, and a speed reducer 56 configured to transmit the rotational motion of the intermediate rotating shaft 53 to the tool driving mechanism 60.

The swinging member 55 is configured by a machine element called swash bearing. The swinging member 55 includes a base end part 55*a* and a swinging lever 55*b*. The base end part 55*a* attached to a middle part of the intermediate rotating shaft 53 such as to surround the intermediate rotating shaft 53. The swinging lever 55*b* connected with the base end part 55*a* via a bearing in an orientation obliquely intersecting with the intermediate rotating shaft 53. When the intermediate rotating shaft 53 rotates, the swinging lever 55*b* of the swinging member 55 swings in the front-rear direction with the base end part 55*a* as a supporting point. The swinging lever 55*b* connects with a piston cylinder 62 of the tool driving mechanism 60. The piston cylinder 62 moves back and forth in the front-rear direction by swinging of the swinging lever 55*b*.

The speed reducer 56 connects with the intermediate rotating shaft 53 on a front side of the swinging member 55. The speed reducer 56 includes a plurality of gears to transmit the rotational motion of the intermediate rotating shaft 53 to a tool holding member 61 of the tool driving mechanism 60 via the plurality of gears.

The tool driving mechanism 60 includes a tool holding member 61. The tool holding member 61 is configured by a member in a quasi-cylindrical shape having a longitudinal direction thereof that is the front-rear direction. The tool holding member 61 is held inside of the tool holding portion 21 in such a state as to be rotatable about a center axis thereof. A front end part of the tool holding member 61 configures the tool mounting portion 22 described above. The tip tool TT mounted to the tool mounting portion 22 is fixed to the tool holding member 61 such as to reciprocate or rotate along with the tool holding member 61.

The tool driving mechanism 60 further includes a piston cylinder 62, a striker 64 and an impact bolt 65 as machine elements to generate a reciprocating motion of the tip tool TT.

The piston cylinder 62 is placed on a rear side of the tool holding member 61 and is configured by a member in a quasi-cylindrical shape having a longitudinal direction thereof that is the front-rear direction and having an approximately fixed internal diameter along the longitudinal direction. The piston cylinder 62 has a closed rear end part and an open front end part. The rear end part of the piston cylinder 62 connects with the swinging lever 55*b* described above. The piston cylinder 62 moves back and forth in the front-rear direction, accompanied with swinging of the swinging lever 55*b* in the front-rear direction.

The piston cylinder 62 accommodates the striker 64 inside. The striker 64 includes a rear end-side portion in a cylindrical shape having a large diameter and a front end-side portion in a cylindrical shape having a small diameter. The rear end-side portion of the striker 64 is fit in the piston cylinder 62 in an air-tight manner, and an air chamber 63 serving as an air spring is formed between the rear end-side portion of the striker 64 and the rear end part of the piston cylinder 62. The striker 64 moves back and forth in the front-rear direction along with the piston cylinder 62 by the action of the air pressure in the air chamber 63.

The impact bolt 65 is placed on a front side of the striker 64. The impact bolt 65 is configured by a member in a cylindrical shape having a longitudinal direction thereof that is the front-rear direction. The impact bolt 65 includes a rear end part placed at such a position that may be brought into contact with the front-side portion of the striker 64, inside of the piston cylinder 62. Part of the impact bolt 65 that is on a front side of the rear end part thereof is inserted in the tube of the tool holding member 61 and is connected with and held by the tool holding member 61.

In the course of a processing operation of the power tool 10 in the hammer mode or in the hammer drill mode, the reciprocating motion of the tip tool TT is generated as described below. When the piston cylinder 62 is moved forward by the swinging motion of the swinging member 55, the striker 64 receives the pressure of the air chamber 63 to move along with the piston cylinder 62. The striker 64 accordingly comes into contact with the rear end part of the impact bolt 65 and applies a striking power to the impact bolt 65. The striking power applied to the impact bolt 65 is transmitted to the tip tool TT, so that the tip tool TT moves to be pushed forward.

During processing of the object material to be processed by the power tool 10, the tip tool TT is pressed against the object material to be processed. When the striker 64 is moved backward along with the piston cylinder 62 by the negative pressure of the air chamber 63, the tip tool TT is pushed back. Such push-forward and push-back of the tip tool TT are repeated in the course of the processing operation of the object material to be processed.

An idle strike preventing mechanism is provided in the tool holding member 61 to prevent the reciprocating motion of the striker 64 in a non-load state where the tip tool TT is not pressed against the object material to be processed. The idle strike preventing mechanism is implemented by known technology, so that detailed description of the blank shot prevention mechanism is omitted herein.

In the course of a processing operation of the power tool 10 in the drill mode or in the hammer drill mode, the rotational motion of the rotating shaft 32*x* of the motor 32 is transmitted to the tool holding member 61 via the speed reducer 56 of the driving force transmission mechanism 52, so as to rotate the tool holding member 61. The tip tool TT rotates with the tool holding member 61.

1-4. Air Flow Generator and Connecting Part

FIG. 3, FIG. 4 and FIGS. 6 to 14 are referred with appropriately, the following describes the configurations of the air flow generator 70 and the connecting part 90 provided at a lower end of the motor housing portion 30.

Figure 6:
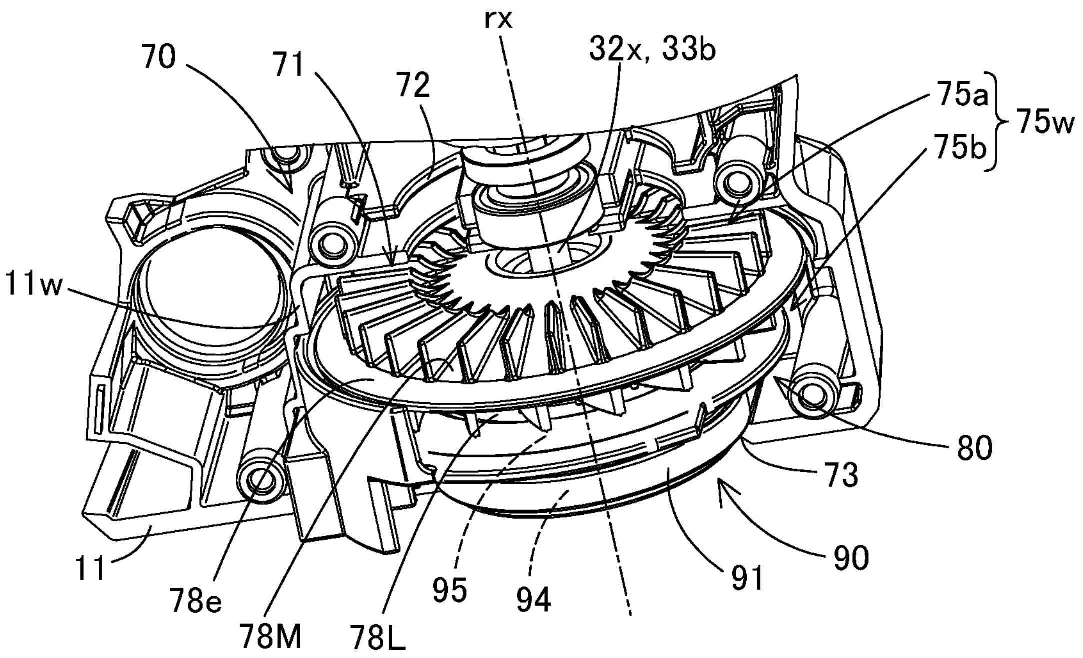
FIG. 6 is a schematic perspective view illustrating an air flow generator and a connecting part.
Figure 7:
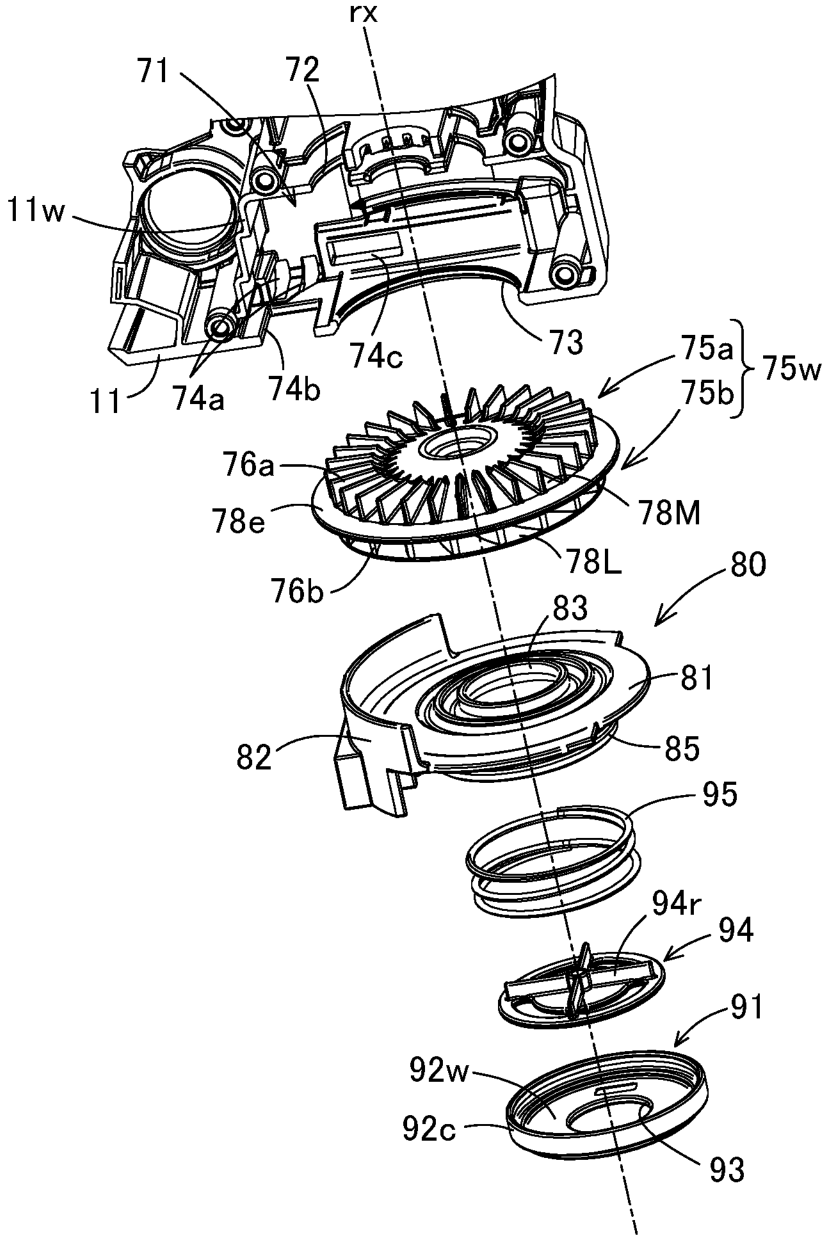
FIG. 7 is a schematic exploded perspective view illustrating the air flow generator and the connecting part.

The following description refers to FIG. 6 and FIG. 7. FIG. 6 illustrates the air flow generator 70 and the connecting part 90 formed at the lower end of the motor housing portion 30, with omission of the right-side housing 11 from the illustration. FIG. 7 illustrates the state that components of the air flow generator 70 and the connecting part 90 are disassembled and are aligned in an axial direction of the rotating shaft 32*x* of the motor 32. The illustration of the right-side housing 11 is omitted from FIG. 7, as in FIG. 6.

The air flow generator 70 includes a fan housing chamber 71, a double fan 75*w*, and a baffle plate 80. The fan housing chamber 71 is divided below an area where the motor 32 is placed in the motor housing portion 30 by an inner wall portion 11*w* provided in the housing 11. An inlet opening 72 is provided in an upper end wall portion of the fan housing chamber 71. The rotating shaft 32*x* of the motor 32 is inserted in the inlet opening 72. The inlet opening 72 serves as a flow path to introduce the air into the fan housing chamber 71 as described later.

A lower end wall portion of the fan housing chamber 71 is configured by a lower end wall portion of the housing 11 having the inclined bottom face 36. The lower end wall portion of the fan housing chamber 71 is provided with a bottom face opening 73 where the connecting part 90 to connect with the dust collector 100 is arranged. As shown in FIG. 3 and FIG. 7, according to the embodiment, the bottom face opening 73 is configured by a through hole in an approximately circular shape having a virtual axis rx, which is an extension of the rotating shaft 32*x* of the motor 32 in the axial direction, as a center axis.

As shown in FIG. 3, first exhaust ports 74*a*, a second exhaust port 74*b* and third exhaust ports 74*c* are provided at a lower end of the fan housing chamber 71 to be pierced through the housing 11 and communicate with outside. The first exhaust ports 74*a* are provide at respective corners in the left-right direction of a lower end part of the motor housing portion 30. The second exhaust port 74*b* is provided on a rear side of the bottom face opening 73. The second exhaust port 74*b* is provided at a position placed between the left and right first exhaust ports 74*a*. The third exhaust ports 74*c* are open in left and right side wall portions in the lower end part of the motor housing portion 30. The third exhaust ports 74*c* are respectively provided on a front side of the left and right first exhaust ports 74*a*.

Referring to FIG. 6 and FIG. 7, the double fan 75*w* and the baffle plate 80 are placed in the fan housing chamber 71. A cap member 91, a shutter member 94 and a biasing member 95 are placed in the fan housing chamber 71 to configure the connecting part 90 on a bottom face of the fan housing chamber 71.

Referring to FIG. 6, FIG. 7, FIG. 8, FIG. 11, FIG. 12 and FIG. 13, the configuration of the double fan 75*w* is described below. The double fan 75*w* is a component formed by stacking a first fan 75*a* and a second fan 75*b* one upon the other and integrating the first fan 75*a* with the second fan 75*b*. As described above, the respective fans 75*a* and 75*b* connect with the second end part 33*b* of the rotating shaft 32*x* of the motor 32. The respective fans 75*a* and 75*b* are configured to rotate around the rotating shaft 32*x* by driving the motor 32 and blow the air in a centrifugal direction.

Figure 11:
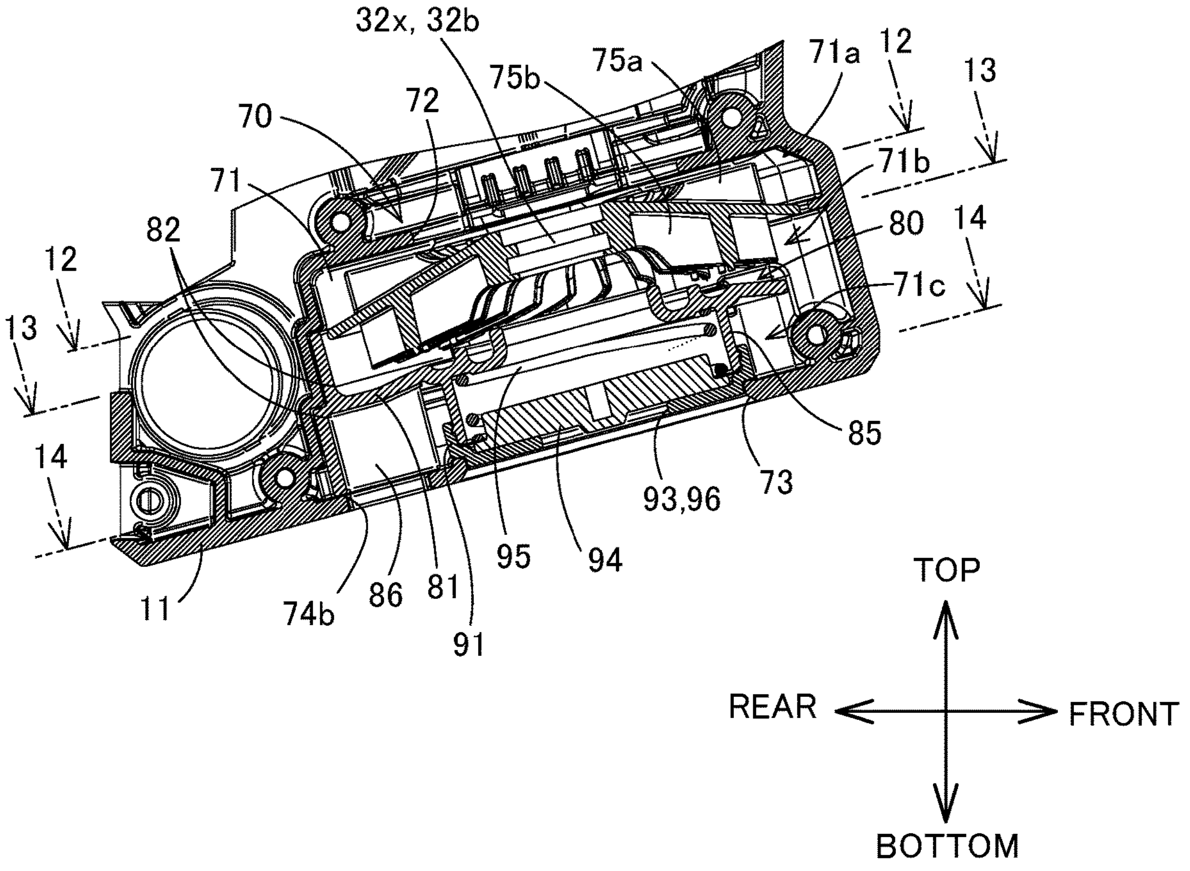
FIG. 11 is a schematic sectional view illustrating an area where the air flow generator and the connecting part are formed, extracted from FIG. 4.

As shown in FIG. 6, the first fan 75*a* placed on an upper side has a center connected with the second end part 33*b* of the rotating shaft 32*x* of the motor 32. As shown in FIG. 6 and FIG. 11, the second fan 75*b* placed on a lower side is located at a position having a center axis thereof identical with the center axis of the first fan 75 to be stacked on the first fan 75*a* via a disk-shaped middle wall portion 78M in the axial direction of the rotating shaft 32*x* of the motor 32. The first fan 75*a* and the second fan 75*b* connects with each other via the middle wall portion 78M, and the second fan 75*b* rotates with the first fan 75*a*.

According to the embodiment, the first fan 75*a* and the second fan 75*b* have configurations different from each other. In the description hereof, the expression that "fans have different configurations" means that fans have differences in a configuration of generating the air flow having a difference in one of the wind speed, the air volume, and the wind pressure at an identical rotation speed or that fans employ different systems of taking in the air and blowing the air. Examples of the differences in the configuration of the fan include the shape of fins, the number of the fins, and the dimensions of the fins.

According to the embodiment, the first fan 75*a* and the second fan 75*b* employ different systems of taking in the air and blowing the air. The first fan 75*a* employs a system of generating a negative pressure on an upstream side in an axial direction of rotating fins to take in the air and of blowing the air in the centrifugal direction. The second fan 75*b*, on the other hand, employs a system of generating a negative pressure in a center area surrounded by rotating fins to take in the air and of blowing the air in the centrifugal direction. The first fan 75*a* and the second fan 75*b* blow the air in the centrifugal direction by different configurations as described below.

Figure 12:
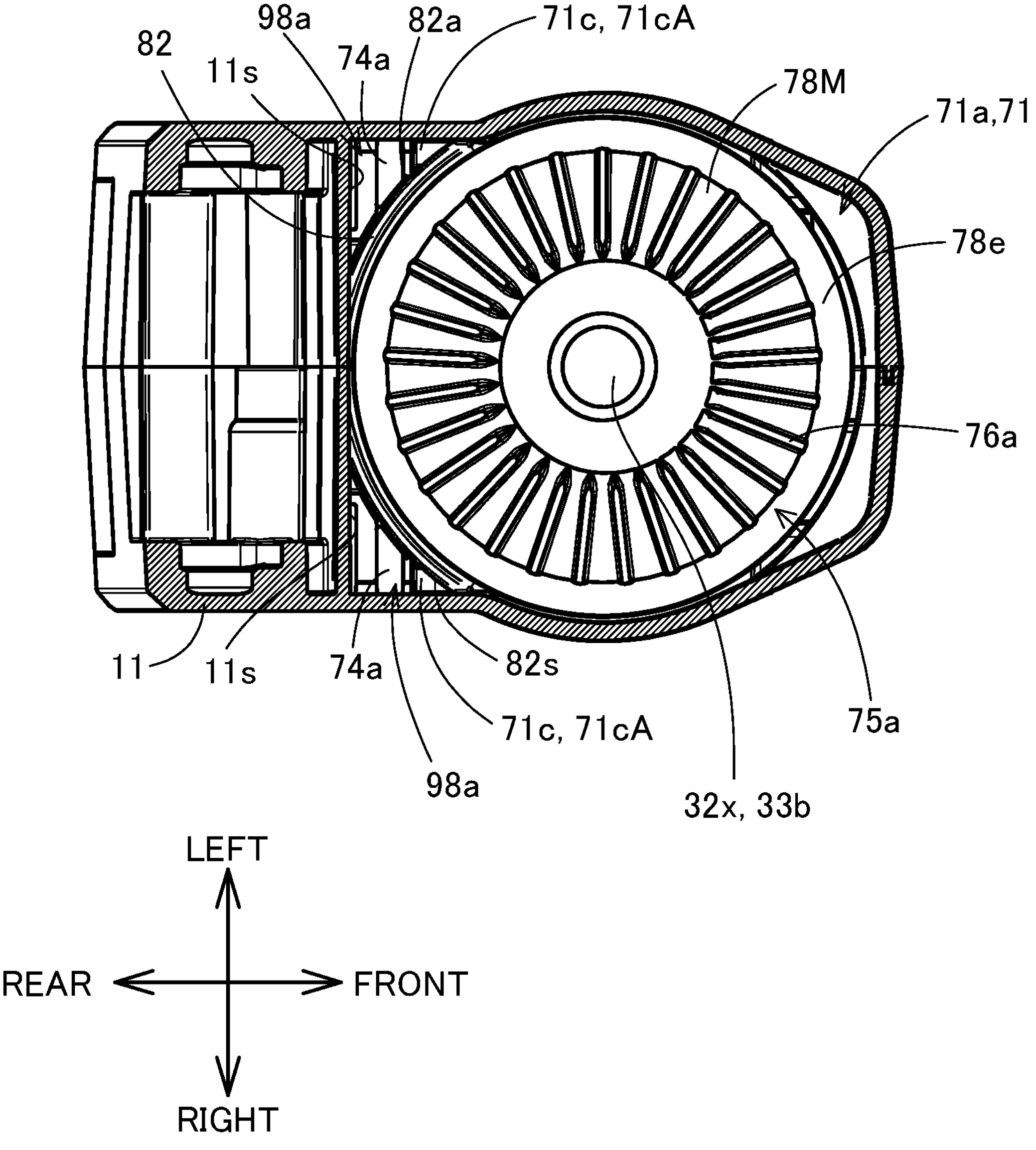
FIG. 12 is a schematic sectional view illustrating a fan housing chamber, taken along line 12-12 shown in FIG. 11.

The first fan 75*a* is configured to rotate by driving and rotation of the motor 32 and blow the air, which is taken in from the motor 32-side, in the centrifugal direction. As shown in FIG. 6 and FIG. 7, a plurality of fins 76*a* configuring the first fan 75*a* are provided on a motor 32-side upper face of the middle wall portion 78M. The upper face of the middle wall portion 78M is in a tapered shape that is inclined downward from a center side toward outside in a radial direction. As shown in FIG. 12, the plurality of fins 76*a* of the first fan 75*a* are arranged radially at equal intervals about the rotating shaft 32*x* of the motor 32 as the center and are respectively extended linearly in the radial direction, when the plurality of fins 76*a* are viewed in a center axis direction of the first fan 75*a*.

Figure 8:
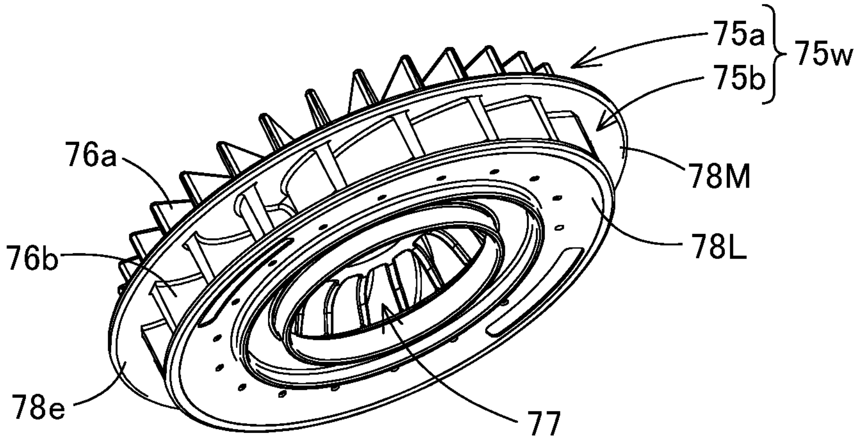
FIG. 8 is a schematic perspective view illustrating a double fan viewed from below.
Figure 13:
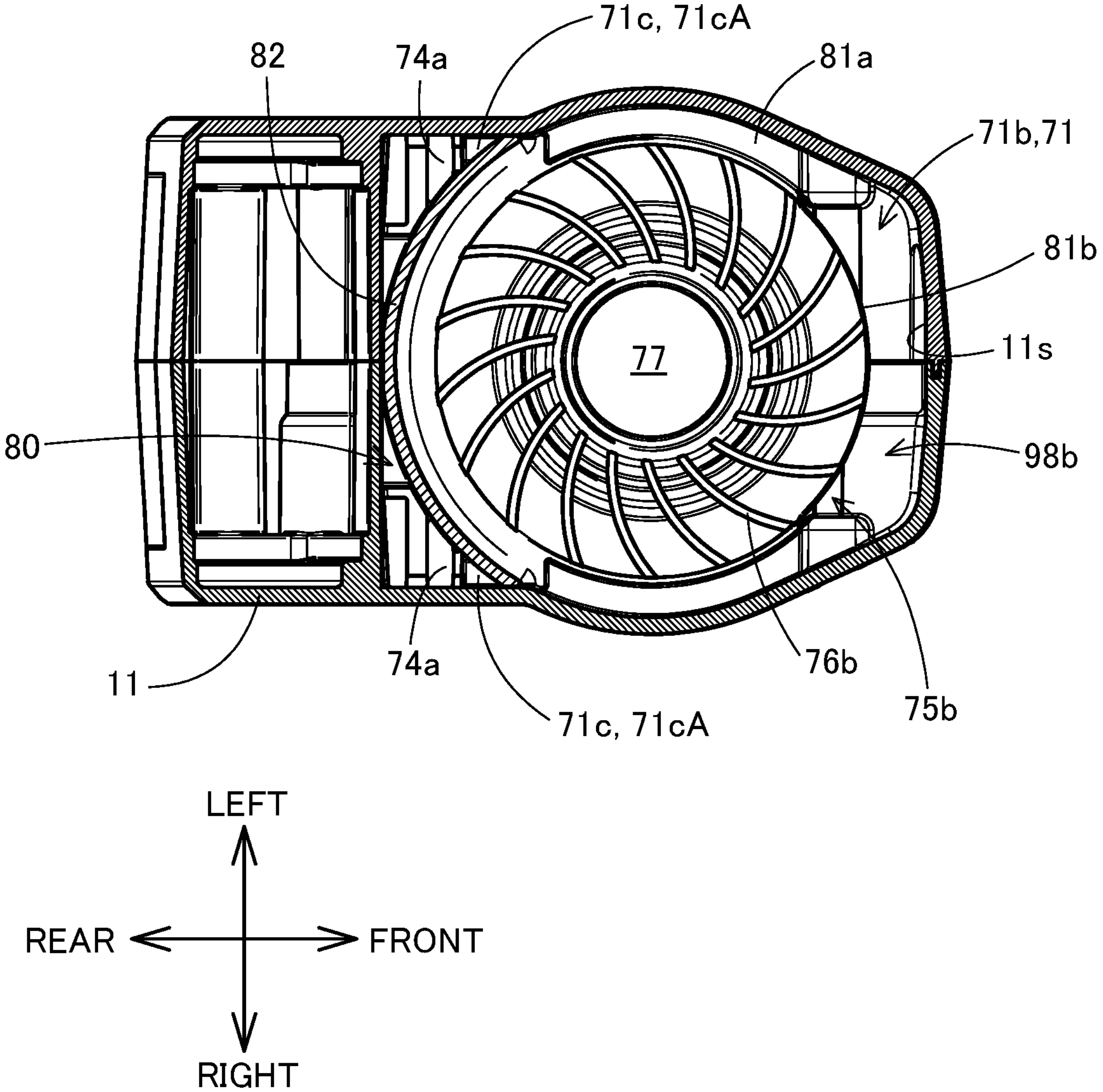
FIG. 13 is a schematic sectional view illustrating the fan housing chamber, taken along line 13-13 shown in FIG. 11.

The second fan 75*b* is configured to rotate by driving and rotation of the motor 32 and blow the air, which is taken in from the connecting part 90 on the lower side, in the centrifugal direction. As shown in FIG. 8, the second fan 75*b* includes an air inlet port 77 provided in a center portion thereof, a plurality of fins 76*b* arranged around the inlet port 77 and extended radially from the inlet port 77, and a toric lower wall portion 78L provided to surround the inlet port 77. As shown in FIG. 11, the lower wall portion 78L is in a shape inclined downward from a center side thereof toward outside in a radial direction. The plurality of fins 76*b* configuring the second fan 75*b* are connected with a lower face of the middle wall portion 78M and with an upper face of the lower wall portion 78L. As shown in FIG. 13, the plurality of fins 76*b* of the second fan 75*b* are respectively curved in similar degrees and are arranged radially at equal intervals about the inlet port 77 as the center, when the plurality of fins 76*b* are viewed in a center axis direction of the second fan 75*b*.

As shown in FIG. 7, a circular flange portion 78*e* is provided around an outer circumferential part of the middle wall portion 78M between the first fan 75*a* and the second fan 75*b*. The flange portion 78*e* is protruded in the centrifugal direction more than outer circumferential ends of the fins 76*a* of the first fan 75*a* and outer circumferential ends of the fins 76*b* of the second fan 75*b*. The functions of the flange portion 78*e* will be described later.

Referring mainly to FIG. 6, FIG. 7, FIG. 9, FIG. 10, and FIG. 11, the following describes the configuration of the baffle plate 80.

As shown in FIG. 6 and FIG. 11, the baffle plate 80 is placed to be laid on the second fan 75*b* at a position opposite to the first fan 75*a*. The baffle plate 80 serves to rectify the air blown in the centrifugal direction by the second fan 75*b*.

Figure 9:
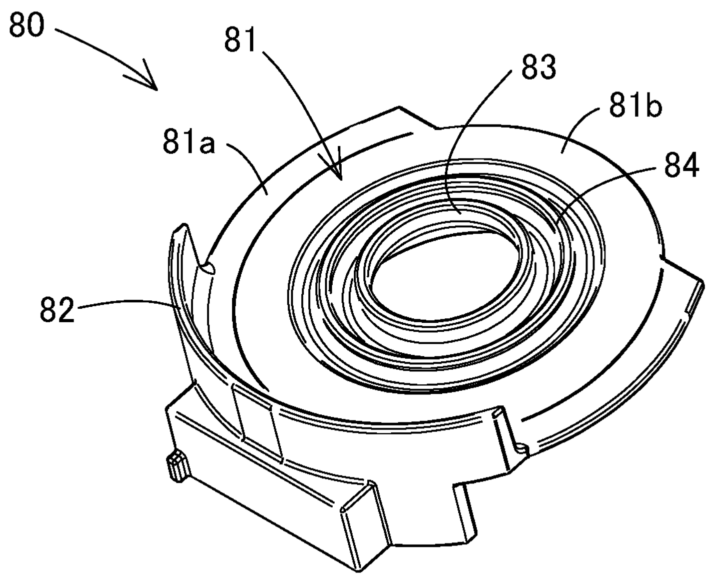
FIG. 9 is a schematic perspective view illustrating a baffle plate viewed from above.
Figure 10:
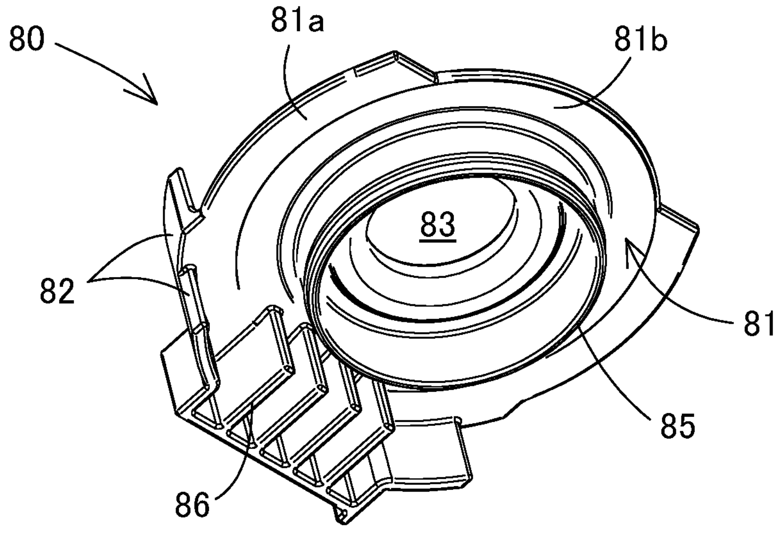
FIG. 10 is a schematic perspective view illustrating the baffle plate viewed from below.

As shown in FIG. 7, FIG. 9 and FIG. 10, the baffle plate 80 includes a center plate portion 81 arranged to intersect with the center axis of the second fan 75*b* and placed along the centrifugal direction of the second fan 75*b*, and a side wall portion 82 formed along part of an outer periphery of the center plate portion 71. According to the embodiment, the center plate portion 81 has a disk shape. A center opening 83 is provided at the center of the center plate portion 81 to connects with the inlet port 77 of the second fan 75*b*.

As shown in FIG. 9, a plurality of concentric convex ribs 84 are formed on a second fan 75*b*-side upper face of the center plate portion 81 such as to surround the center opening 83. A labyrinth seal is defined by and formed between the plurality of convex ribs 84 and the lower wall portion 78L of the second fan 75*b*. As shown in FIG. 10, a cylindrical portion 85 is provided on a lower face of the center plate portion 81 on an opposite side to the second fan 75*b*, such as to surround the center opening 83 and to be protruded toward the bottom face opening 73 that configures the connecting part 90.

As shown in FIG. 9 and FIG. 10, the center plate portion 81 includes a first part 81*a* and a second part 81*b* provided around the center opening 83. The first part 81*a* is a continuous part having an end portion that is located on the outer side of an end portion of the second fan 75*b* in the centrifugal direction of the second fan 75*b*. According to the embodiment, the first part 81*a* is a part having a larger radius than the radius of the second fan 75*b*. The second part 81*b* is a part having an end portion that is located at a position closer to the center of the second fan 75*b* than the end portion of the first part 81*a*. According to the embodiment, the second part 81*b* is a part having the end portion that is located on the inner side of the end portion of the first part 81*a* in the radial direction. According to the embodiment, the second part 81*b* is configured as a part having a smaller radius than the radius of the first part 81*a*. As shown in FIG. 11, the radius of the second part 81*b* is approximately equal to the radius of the second fan 75*b* according to the embodiment. The second part 81*b* may be formed, for example, in a range of approximately one quarter of the circumference of the center plate portion 81. As described later, the second part 81*b* serves as a part of rectifying a second air flow, which is blown in the centrifugal direction by the second fan 75*b*, such as to turn back the second air flow to a lower side of the center plate portion 81. According to another embodiment, the shape of the center plate portion 81 is not limited to the disk shape. In the case where the center plate portion 81 is formed in a disk shape, an outer circumferential end portion of the second part 81*b* may not be necessarily formed in an arc shape but may be formed, for example, in a partly-cut arc shape configuring the outer periphery of the disk-shaped center plate portion 81.

As shown in FIG. 6, the side wall portion 82 is extended in the axial direction of the rotating shaft 32*x* of the motor 32 on a lateral side of the second fan 75*b*. As shown in FIG. 6 and FIG. 11, an upper end of the side wall portion 82 is extended from the center plate portion 81 to a lateral area of the second fan 75*b*. The upper end of the side wall portion 82 is extended to the vicinity of an outer circumferential end of the flange portion 78*e* of the middle wall portion 78M. As shown in FIG. 11, a lower end of the side wall portion 82 is extended to the lower end wall portion of the fan housing chamber 71. As shown in FIG. 9 and FIG. 10, the side wall portion 82 is formed on an opposite side to the second part 81*b* of the center plate portion 81 across the center axis of the second fan 75*b* in the centrifugal direction of the second fan 75*b*. According to the embodiment, the side wall portion 82 is formed on an opposite side in the radial direction across the center of the disk-shaped center plate portion 81. The side wall portion 82 may be formed, for example, in a range of approximately one quarter of the circumference of the center plate portion 81. The functions of the side wall portion 82 will be described later.

As shown in FIG. 12, the second exhaust port 74*b* provided at the lower end of the fan housing chamber 71 is formed at a position facing the baffle plate 80. As shown in FIG. 10, a plurality of parallel ribs 86 are formed on a second exhaust port 74*b*-side lower face of the center plate portion 81 of the baffle plate 80. The respective ribs 86 are formed to be extended in the front-rear direction on a rear side of the cylindrical portion 85. The respective ribs 86 have rear ends connecting with the side wall portion 82. As shown in FIG. 3, the second exhaust port 74*b* is parted and divided into a plurality of areas by the plurality of ribs 86 of the baffle plate 80. According to another embodiment, only one rib 86 may be formed on the baffle plate 80. Even this one rib 86 serves to part and divide the second exhaust port 74 into two areas.

Referring to FIG. 7 and FIG. 11, the following describes the cap member 91, the shutter member 94, the biasing member 95 and the connecting part 90 configured by these members.

As shown in FIG. 7, the cap member 91 includes an outer peripheral cylindrical portion 92*c* in a cylindrical shape provided on an outer periphery thereof, and a toric bottom wall portion 92*w* connecting with an inner side of a lower end of the outer peripheral cylindrical portion 92*c*. A connection opening 93 in an approximately circular shape is provided at the center of the bottom wall portion 92*w*. As shown in FIG. 11, the outer peripheral cylindrical portion 92*c* is fit in a lower end of the cylindrical portion 85 of the baffle plate 80, so that the cap member 91 is fixed to the cylindrical portion 85 of the baffle plate 80. The cap member 91 is also fit in the bottom face opening 73 in such a state that an outer periphery of the bottom wall portion 92*w* comes into contact with an inner periphery of the bottom face opening 73 air-tightly.

As shown in FIG. 7, the shutter member 94 is configured by a disk-shaped member having a smaller diameter than the inner diameter of the cap member 91 and the inner diameter of the cylindrical portion 85 of the baffle plate 80. Reinforcing ribs 94*r* are formed on an upper face of the shutter member 94. Reinforcing ribs 94*r* are orthogonal to each other in a quasi-cross shape at the center of the shutter member 94. As shown in FIG. 11, the shutter member 94 is placed inside of the cylindrical portion 85 of the baffle plate 80 such as to air-tightly close the connection opening 93 at the center of the cap member 91.

As shown in FIG. 7 and FIG. 11, the biasing member 95 is configured by a coil spring that has a diameter substantially equal to the diameter of the shutter member 94. As shown in FIG. 11, the biasing member 95 is placed along with the shutter member 94 in the cylindrical portion 85 of the baffle plate 80. In the state that an upper end side of the biasing member 95 is supported by the center plate portion 81 of the baffle plate 80, a lower end side of the biasing member 95 presses and biases an outer peripheral portion of the shutter member 94 against the cap member 91.

Figure 19:
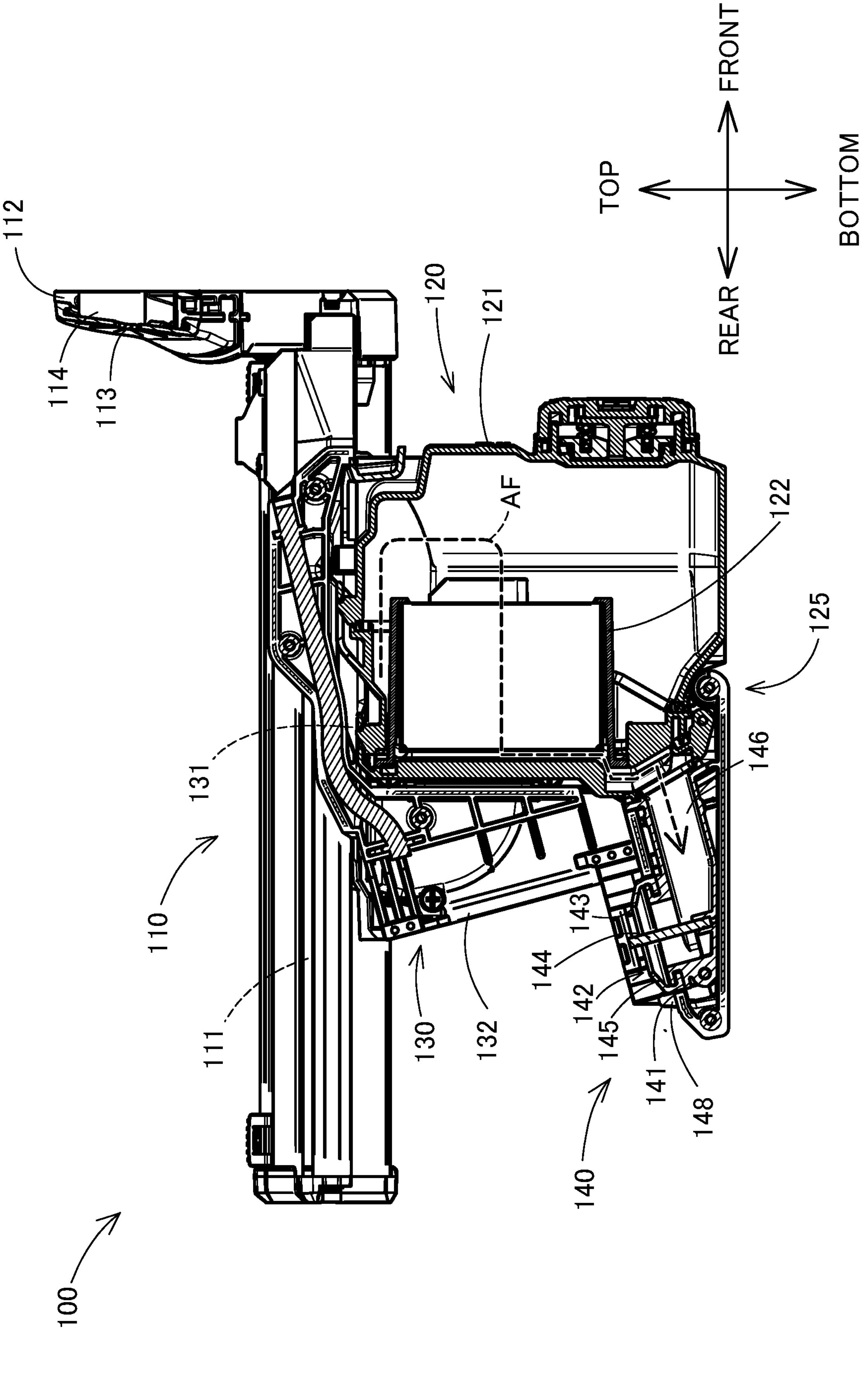
FIG. 19 is a schematic sectional view illustrating the dust collector, taken along line 19-19 shown in FIG. 18.

As shown in FIG. 11, when the dust collector 100 is not connected, the connecting part 90 is in a state that the connection opening 93 of the cap member 91 is closed by the shutter member 94 air-tightly. When the dust collector 100 is connected with the connecting part 90, the shutter member 94 is pressed upward against the biasing force of the biasing member 95 by a pin 144, which is shown in FIG. 19 and described later, of a dust collector-side connecting part 142 of the dust collector 100. This opens the connection opening 93 of the cap member 91 and allows the air to be circulated to and from the dust collector 100. The connection opening 93 of the cap member 91 serves as a connection flow path 96 to take in the air from the dust collector 100.

According to the configuration of providing the connection flow path 96 in the connecting part 90 that is provided in the inclined bottom face 36 on the lower side of the motor 32 as described above, the distance between the second fan 75*b* and the connection flow path 96 is shortened. This configuration accordingly enables the suction power generated in the power tool 10 to be efficiently transmitted to the dust collector 100 and thereby enhances the suction performance of the dust collector 100.

Referring to FIG. 11, FIG. 12, FIG. 13 and FIG. 14, the following describes the divisions of the fan housing chamber 71.

FIG. 11 is referred. The fan housing chamber 71 is parted and divided by the middle wall portion 78M into a first fan chamber 71*a* where the first fan 75*a* is placed and a second fan chamber 71*b* where the second fan 75*b* is placed. The fan housing chamber 71 is also parted and divided by the center plate portion 81 of the baffle plate 80 into the second fan chamber 71*b* and an exhaust chamber 71 provided on the lower side of the second fan chamber 71*b*.

Figure 14:
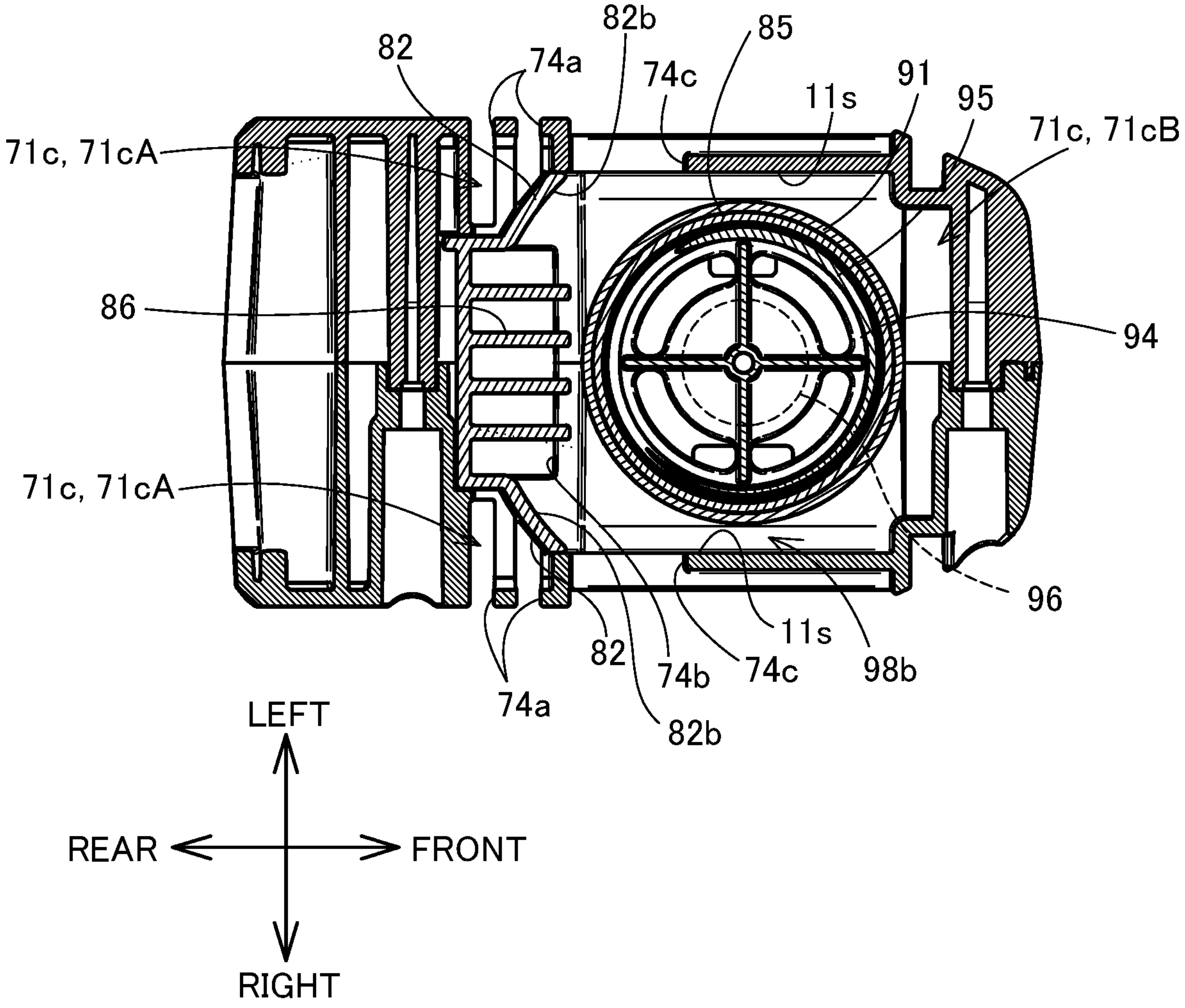
FIG. 14 is a schematic sectional view illustrating the fan housing chamber, taken along line 14-14 shown in FIG. 11.

FIG. 14 is referred. The first exhaust ports 74*a*, the second exhaust port 74*b* and the third exhaust pots 74*c* are open to the exhaust chamber 71*c*. The first exhaust ports 74*a* are provided at respective corners on the respective sides in the left-right direction in a rear end part of the exhaust chamber 71*c*. The second exhaust port 74*b* is provided between the first exhaust ports 74*a* on the left side and on the right side. The second exhaust port 74*b* is parted and divided into a plurality of areas by the plurality of ribs 86 provided in the baffle plate 80 described above. The third exhaust ports 74*c* are open in the left-right direction on respective front sides of the first exhaust ports 74*a* on the left side and on the right sides.

The exhaust chamber 71*c* is parted and divided by the side wall portion 82 of the baffle plate 80 into a first exhaust area 71*c*A that communicates with outside of the housing 11 through the first exhaust ports 74*a* and a second exhaust area 71*c*B that communicates with outside of the housing 11 through the second exhaust port 74*b* and the third exhaust ports 74*c*. The cylindrical portion 85 of the baffle plate 80 that communicates with the connection flow path 96 of the connecting part 90 passes through the middle of the second exhaust area 71*c*B.

Referring to FIG. 12, the first fan chamber 71*a* communicates with the first exhaust area 71*c*A of the exhaust chamber 71*c* described above at two corners in the left-right direction of a rear end part thereof. Referring to FIG. 13, the second fan chamber 71*b* is separated by the side wall portion 82 of the baffle plate 80 to block the communication with the first exhaust area 71*c*A.

In the second fan chamber 71*b*, the small-diameter second part 81*b* of the center plate portion 81 of the baffle plate 80 is separate from the inner wall surface of the housing 11. According to this configuration, the second fan chamber 71*b* communicates with the second exhaust area 71*c*B of the exhaust chamber 71*c* through a clearance between the second part 81*b* and the inner wall surface of the housing 11.

The first part 81*a* of the center plate portion 81 of the baffle plate 80, on the other hand, comes into contact with the inner wall surface of the housing 11 such as to part the second fan chamber 71*b* and the exhaust chamber 71*c* from each other.

1-5. First Air Flow and Second Air Flow

Figure 15:
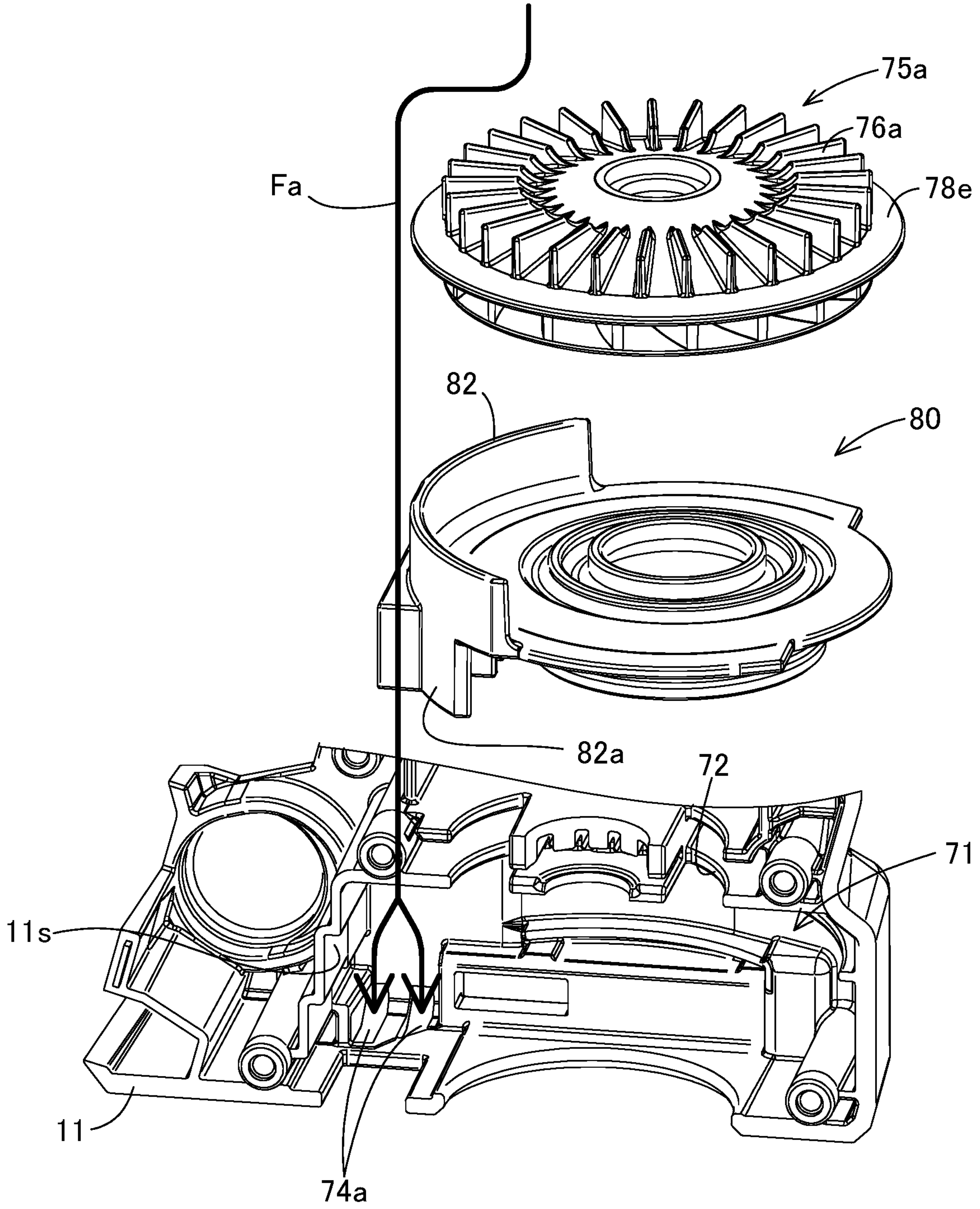
FIG. 15 is an explanatory drawing illustrating the flows of first air flow.

Referring to FIG. 4 and FIG. 15, the following describes a first air flow Fa generated by the first fan 75*a*. Arrows indicating the flows of the first air flow Fa are illustrated in FIG. 4 and FIG. 15.

First, FIG. 15 is referred. When the first fan 75*a* is driven, the air is blown in the centrifugal direction from the first fan 75*a* to generate the first air flow Fa. The first air flow Fa passes through a space between a first wall surface 82*a* of the side wall portion 82 of the baffle plate 80 and an inner wall surface 11*s* of the housing 11. The first wall surface 82*a* faces outside in the radial direction and the inner wall surface 11*s* is opposed to the first wall surface 82*a*. The first air flow Fa is discharged through the first exhaust ports 74*a* to outside of the housing 11.

A flow path that guides the first air flow Fa generated the first fan 75*a* to the first exhaust ports 74*a* is called a "first exhaust flow path 98*a*". As shown in FIG. 12, according to the embodiment, part of the first exhaust flow path 98*a* is formed in a space that faces the first wall surface 82*a* of the side wall portion 82 of the baffle plate 80 and the inner wall surface 11*s* of the housing 11.

Next, FIG. 4 is referred. A negative pressure is generated on an upstream side of the first fan 75*a* by driving the first fan 75*a*. This negative pressure forms the first air flow Fa that sucks the outside air into the housing 11 through the upper face intake port 23 provided on the upper face of the tool holding portion 21. The first air flow Fa passes through the area where the motor 32 is placed with exchanging heat with the motor 32 and flows into the first fan chamber 71*a* through the inlet opening 72 of the fan housing chamber 71. During driving of the power tool 10, the motor 32 is accordingly cooled down by the first air flow Fa which is generated by driving the first fan 75*a*.

Figure 16:
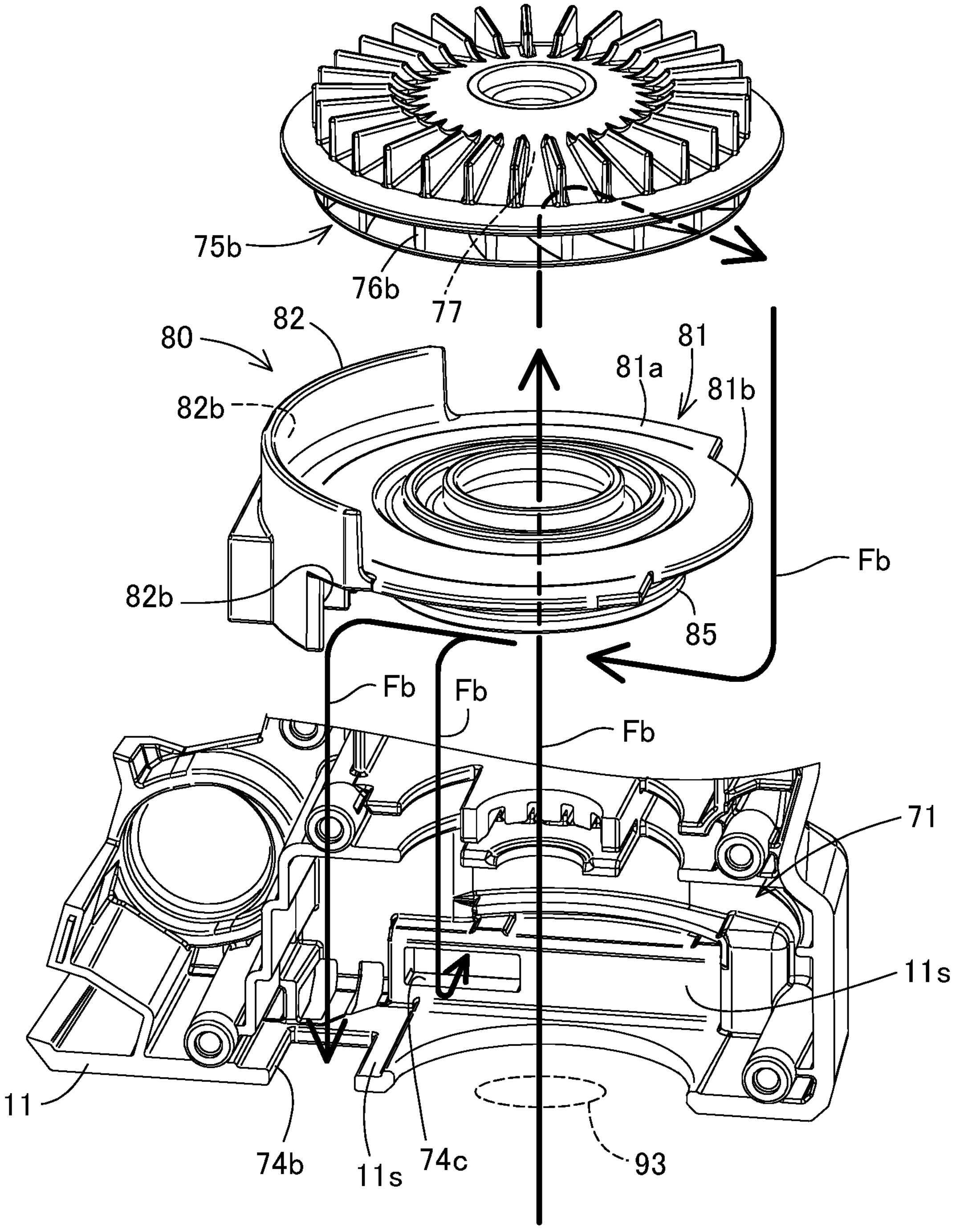
FIG. 16 is an explanatory drawing illustrating the flows of second air flow.

Referring to FIG. 16, the following describes a second air flow Fb generated by the second fan 75*b*. Arrows indicating the second air flow Fb are illustrated in FIG. 16. The second air flow Fb is generated by driving the second fan 75*b* in a state that the dust collector 100 connects with the connecting part 90 and that the air is allowed to be sucked in from the dust collector 100 through the connection opening 93 of the connecting part 90.

When the second fan 75*b* is driven, the air is sucked from the connection opening 93 of the connecting part 90 through the cylindrical portion 85 of the baffle plate 80 into the inlet port 77 at the center of the second fan 75 to generate the second air flow Fb that is blown in the centrifugal direction of the second fan 75*b*. The dust collector 100 takes advantage of this suction power generated by driving the second fan 75*b* to collect the dust.

The second air flow Fb is guided toward the second part 81*b* of the center plate portion 81 of the baffle plate 80 by a second wall surface 82*b* of the side wall portion 82 of the baffle plate 80 that faces inside in the radial direction and an inner wall surface of the second fan chamber 71*b* configured by the inner wall surface of the housing 11. The second air flow Fb is turned back by the second part 81*b* and flows into the exhaust chamber 71*c*. The second air flow Fb is guided by an outer wall surface of the cylindrical portion 85 of the baffle plate 80 and the inner wall surface 11*s* of the housing 11 to be discharged laterally (in the left-right direction) from the third exhaust ports 74*c*. The second air flow Fb is also guided by a lower part of the second wall surface 82*b* of the side wall portion 82 of the baffle plate 80 that configures the inner wall surface of the exhaust chamber 71*c* and by the ribs 86 to be discharged downward from the second exhaust port 74*b*.

A flow path that guides the second air flow Fb generated by the second fan 75*b* to the second exhaust port 74*b* is called a "second exhaust flow path 98*b*". According to the embodiment, as shown in FIG. 13 and FIG. 14, part of the second exhaust flow path 98*b* is formed in a space that faces the second wall surface 82*b* of the side wall portion 82 of the baffle plate 80 and the inner wall surface 11*s* of the housing 11.

As described above, the first air flow Fa generated by the first fan 75*a* is guided through the first exhaust flow path 98*a* to the first exhaust ports 74*a*. The second air flow Fb generated by the second fan 75*b* is, on the other hand, guided through the second exhaust flow path 98*b* to the second exhaust port 74*b* and the third exhaust ports 74*c*. According to the configuration of the power tool 10 of the embodiment, the first exhaust flow path 98*a* and the second exhaust flow path 98*b* are separated from each other until the first air flow Fa and the second air flow Fb are discharged to outside of the housing 11. Thereby the first air flow Fa and the second air flow Fb suppress from interfering with each other. This configuration accordingly suppresses the occurrence of a pressure loss by interference of the first air flow Fa and the second air flow Fb with each other and suppresses the flow velocities of the first air flow Fa and the second air flow Fb from being lowered by the pressure loss. This configuration thus suppresses the cooling effect of the motor 32 by the first air flow Fa from being lowered and also suppresses the suction power of the dust collector 100 caused by the second air flow Fb from being reduced.

As described above, according to the embodiment, part of the baffle plate 80 configures a partition wall that separates the first exhaust flow path 98*a* and the second exhaust flow path 98*b* from each other. This configuration enables part of the baffle plate 80 to be used for partition between the first exhaust flow path 98*a* and the second exhaust flow path 98*b* and thereby allows for reduction of the number of components required for the power tool 10.

As described above, according to the embodiment, the first exhaust flow path 98*a* and the second exhaust flow path 98*b* are formed by using the wall surfaces 82*a* and 82*b* of the side wall portion 82 of the baffle plate 80 and the inner wall surface 11*s* of the housing 11 of the fan housing chamber 71. This configuration enables the first exhaust flow path 98*a* and the second exhaust flow path 98*b* separated from each other to be readily formed together on the lateral side of the second fan 75*b* in a space-saving manner.

As described above, according to the embodiment, the center plate portion 81 of the baffle plate 80 includes the second part 81*b* having the smaller radius than the radius of the first part 81*a*. The flow path which the second air flow Fb flows from the second fan chamber 71*b* to the exhaust chamber 71*c* is formed between this second part 81*b* and the inner wall surface 11*s* of the housing 11. In the power tool 10, the smaller radius of the second part 81*b* increases the flow passage area and decreases the flow resistance in the second exhaust flow path 98*b* which is defined by the second part 81*b* and which the second air flow Fb is turned back in. This configuration accordingly suppresses the flow velocity of the second air flow Fb from being lowered and enhances the suction power of the dust collector 100.

In the baffle plate 80 of the embodiment, the side wall portion 82 is formed on the opposite side to the second part 81*b* across the center axis of the second fan 75*b* in the centrifugal direction of the second fan 75*b*. This configuration enables the second air flow Fb generated by the second fan 75*b* to be once separated from the first exhaust flow path 98*a*. This configuration thus further suppresses the first air flow Fa and the second air flow Fb from interfering with each other.

The baffle plate 80 of the embodiment is provided with the ribs 86 that divide and part the second exhaust port 74*b* into a plurality of areas as described above. The ribs 86 serve to smoothen the emission of the second air flow Fb from the second exhaust port 74. This configuration accordingly further reduces the pressure loss of the second air flow Fb at the second exhaust port 74*b*. The ribs 86 also serve to suppress invasion of foreign substances from outside of the housing 11 through the second exhaust port 74*b*. This configuration thus allows for a large opening area of the second exhaust port 74*b* and thereby further reduces the pressure loss of the second air flow Fb at the second exhaust port 74*b*. This configuration accordingly further suppresses reduction of the suction power of the dust collector 100 causes by the pressure loss of the second air flow Fb.

According to the embodiment, the first fan 75*a* and the second fan 75*b* have the configurations different from each other. The first fan 75*a* is configured to be more suitable for generation of the first air flow Fa that cools down the motor 32, whereas the second fan 75*b* is configured to be more suitable for generation of the second air flow Fb that is used for dust collection. Even when the first fan 75*a* and the second fan 75*b* respectively generate the air flows having different wind speeds, different air volumes and different wind pressures, the configuration of the embodiment suppresses the exhausts of the respective air flows from interfering with each other as described above. This configuration accordingly suppresses reduction of the performance of cooling down the motor 32 and reduction of the suction power of the dust collector 100 caused by the different configurations of the first fan 75*a* and the second fan 75*b*.

According to the embodiment, the first fan 75*a* and the second fan 75*b* respectively employ different configurations for the system of taking in the air and blowing the air. More specifically, the first fan 75*a* is configured to blow the air, which is taken in from the motor 32-side, in the centrifugal direction, and the second fan 75*b* is configured to blow the air, which is taken in from the inlet port 77 at the center, in the centrifugal direction. The power tool 10 of the embodiment uses the two fans 75*a* and 75*b* having the different configurations in combination, so as to enable two different air flows to be generated efficiently by using an identical power source.

According to the embodiment, the flange portion 78*e* is provided around the outer circumference of the middle wall portion 78M between the first fan 75*a* and the second fan 75*b*. This configuration suppresses the first air flow Fa generated by the first fan 75*a* and the second air flow Fb generated by the second fan 75*b* from interfering with each other in the fan housing chamber 71. Accordingly, this configuration more effectively suppresses the occurrence of a pressure loss caused by the interference of the two air flows Fa and Fb.

According to the embodiment, as shown in FIG. 3, the first exhaust ports 74*a*, the second exhaust port 74*b* and the third exhaust ports 74*c* are placed together in the lower end part 35 of the housing 11. The first exhaust ports 74*a* and the second exhaust port 74*b* are configured to discharge the air at least partly in an identical direction or more specifically a downward direction. This configuration suppresses dispersion of the exhaust from the power tool 10 and thereby suppresses the exhaust of the power tool 10 from kicking up the dust and interfering with a processing operation.

According to the embodiment, as shown in FIG. 3, the first exhaust ports 74*a* are provided at the corners of the lower end part 35 and are configured to discharge the exhausts in a plurality of directions, i.e., downward and lateral directions. This configuration increases the flow rate of the first air flow Fa discharged from the first exhaust ports 74*a* and thereby enhances the performance of cooling down the motor 32 by the first air flow Fa.

1-6. Dust Collector and Power tool System

Referring to FIG. 17, FIG. 18, FIG. 19, FIG. 20, FIG. 21 and FIG. 22, the following describes the configuration of the dust collector 100 and the configuration of the power tool system 200. As described above, the power tool system 200 is configured by attaching the dust collector 100 to the power tool 10. A front-rear direction, a top-bottom direction and a left-right direction that are directions mentioned below in relation to the dust collector 100 and the power tool system 200 are identical with the directions relating to the power tool 10 when the power tool 10 is included in the power tool system 200.

Figure 17:
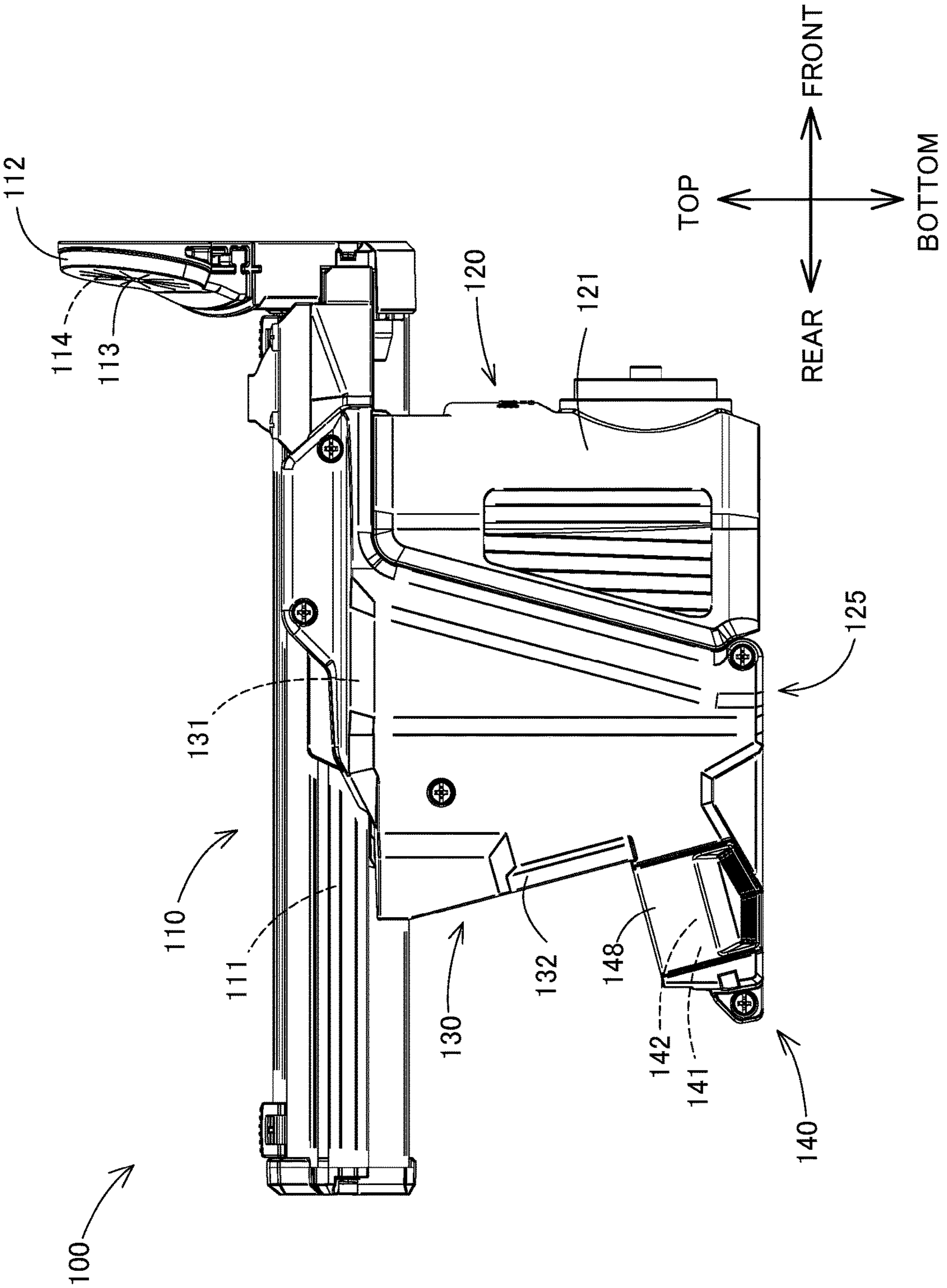
FIG. 17 is a schematic side view illustrating a dust collector.
Figure 18:
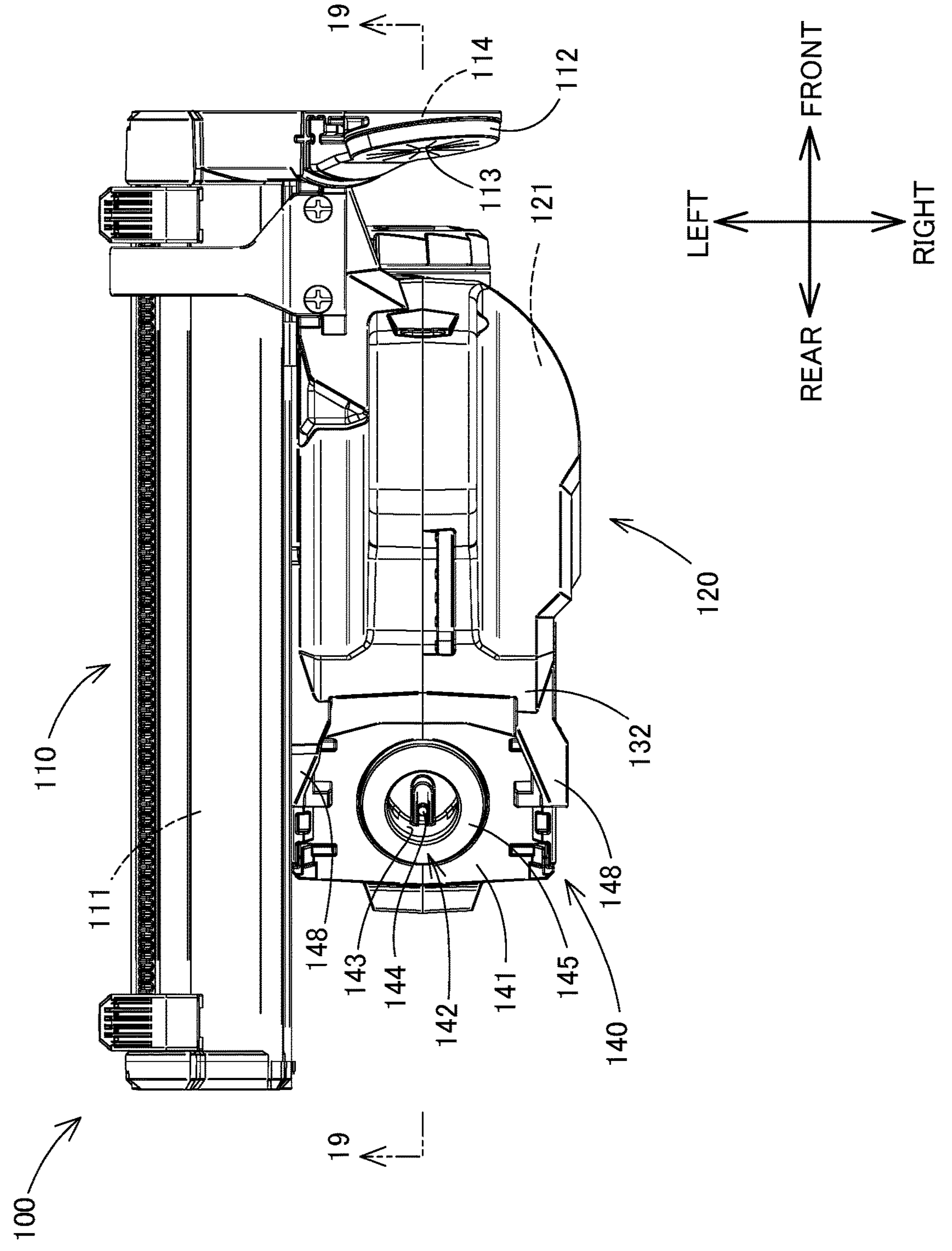
FIG. 18 is a schematic top view illustrating the dust collector.

First, referring to FIG. 17, FIG. 18 and FIG. 19, the configuration of the dust collector 100 is described. The dust collector 100 includes a dust collecting flow path portion 110 extended in the front-rear direction at an upper end thereof, a dust collecting portion 120 connected with the dust collecting flow path portion 110, and a rear extending portion 140 extended rearward from a lower end part of the dust collecting portion 120.

As shown in FIG. 17 and FIG. 18, the dust collecting flow path portion 110 connects with a left side of an upper end part of the dust collecting portion 120. The dust collecting flow path portion 110 is configured by a piping member forming a suction flow path 111 that is a flow path of taking in the air. A nozzle portion 112 is provided at a front end of the dust collecting flow path portion 110 to be protruded upward. An insertion port 113 is provided in a middle part of the nozzle portion 112 to receive a tip end of the tip tool TT inserted therein. The nozzle portion 112 includes a dust collecting intake port 114 that communicates with the suction flow path 111 inside of the dust collecting flow path portion 110 to suck in the dust with the outside air.

Figure 20:
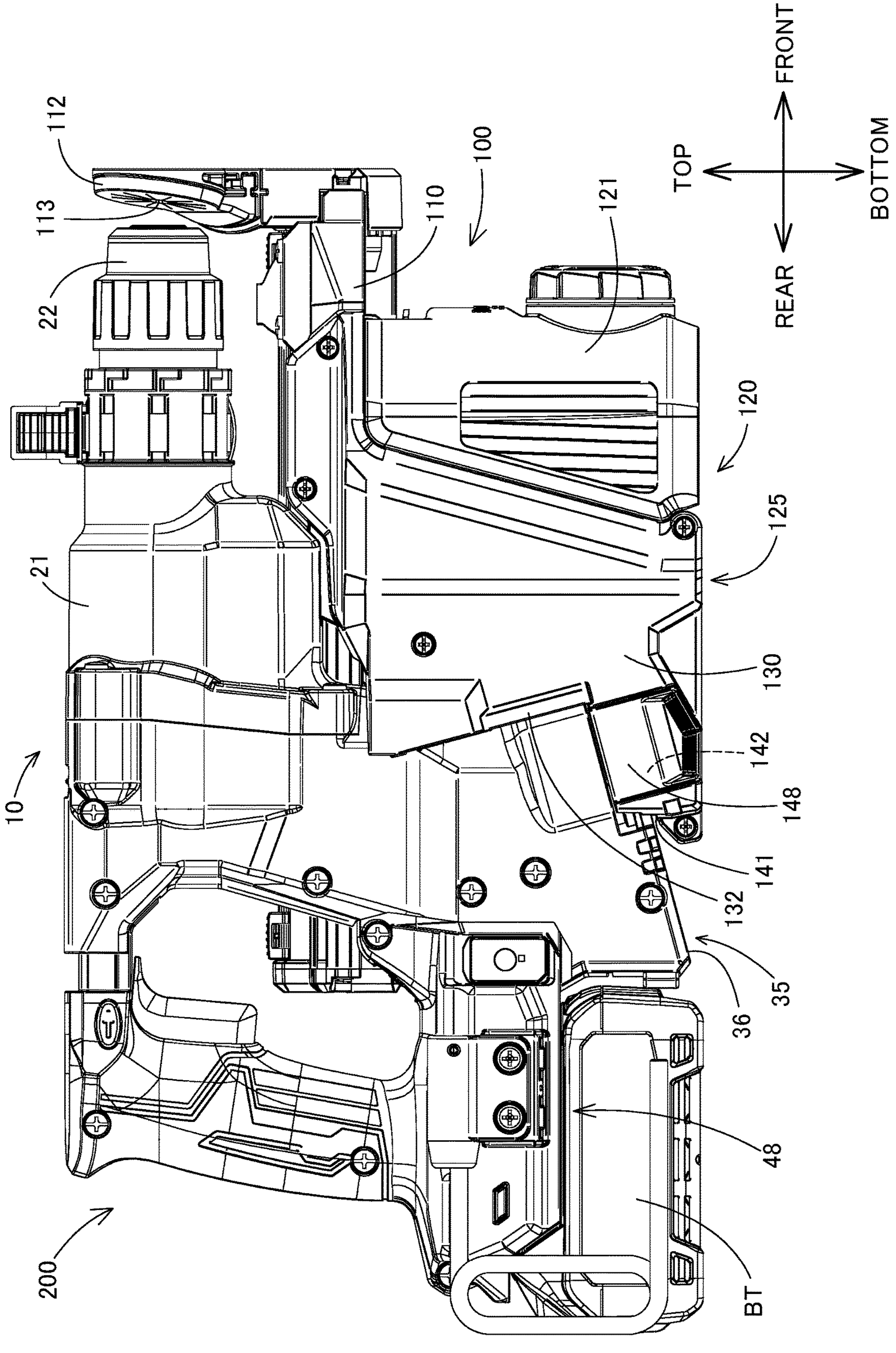
FIG. 20 is a schematic side view illustrating a power tool system.
Figure 21:
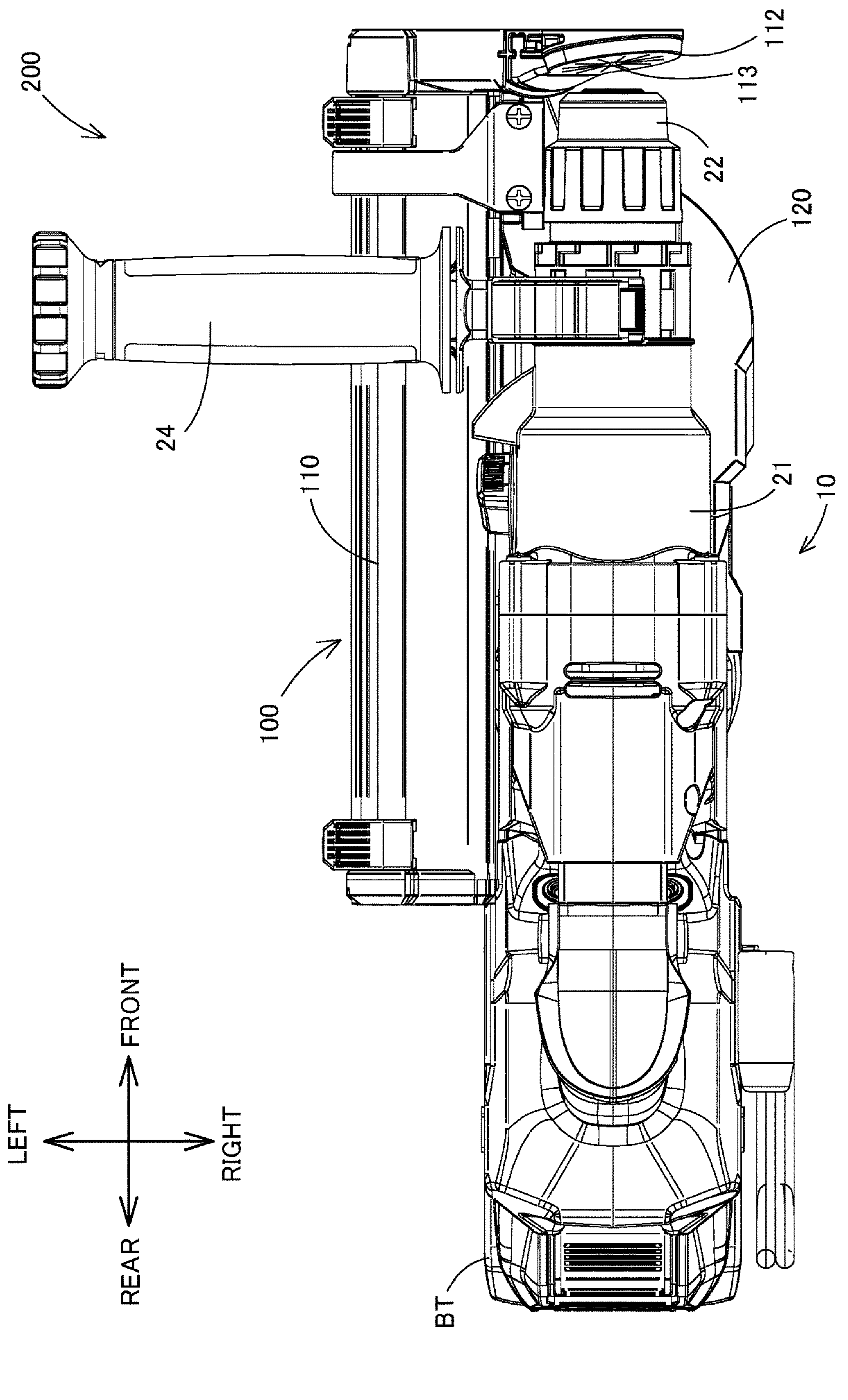
FIG. 21 is a schematic top view illustrating the power tool system.
Figure 22:
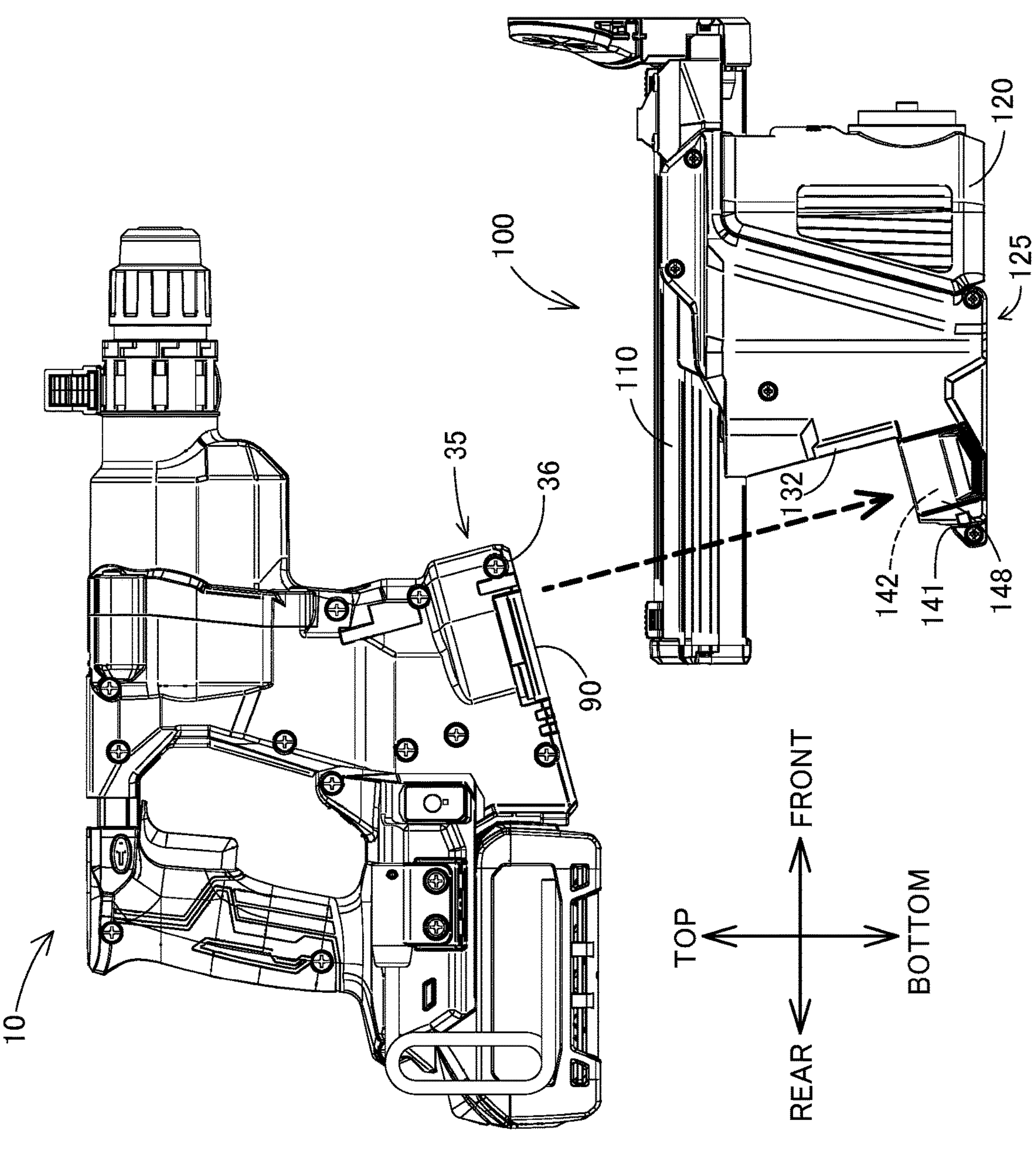
FIG. 22 is a schematic diagram illustrating a process of attaching the dust collector to the power tool.

As shown in FIG. 20 and FIG. 21, in assembly of the power tool system 200, the dust collecting flow path portion 110 is placed along the tool holding portion 21 at a location obliquely below and on the left side of the tool holding portion 21 of the power tool 10. The nozzle portion 112 is placed at a location facing the tool mounting portion 22 of the tool holding portion 21 in the front-rear direction, such as to enable the tip end of the tip tool TT to be inserted into the insertion port 113.

The dust collecting flow path portion 110 is extendable in a forward direction by sliding and moving an inner flow path member placed inside of an exterior member relative to the exterior member, although not being described in detail. This configuration enables the nozzle portion 112 to be placed corresponding to the position of the tip end of the tip tool TT that is mounted to the tool mounting portion 22. A stretchable flexible hose that forms an air flow path is placed inside of the dust collecting flow path portion 110 such as to allow the dust collecting flow path portion 110 to be stretched and contracted.

As shown in FIG. 17 and FIG. 18, the dust collecting portion 120 has a quasi-rectangular parallelepiped appearance placed to have a longitudinal direction thereof along the front-rear direction. The dust collecting portion 120 includes a dust box 121 having a hollow rectangular parallelepiped shape and an outer shell frame portion 130 provided to cover a rear end part of the dust box 121.

The dust collecting flow path portion 110 connects with the outer shell frame portion 130. An upstream-side connection flow path 131 is provided inside of the outer shell frame portion 130 to connect the suction flow path 111 in the dust collecting flow path portion 110 with inside of the dust box 121. The rear extending portion 140 described above connects with a rear side of a lower end of the outer shell frame portion 130.

As shown in FIG. 18, the outer shell frame portion 130 includes a pair of cover wall portions 132. The pair of cover wall portions 132 sandwich a front end part of the motor housing portion 30 of the power tool 10 in the left-right direction in the state that the power tool system 200 is configured. The pair of cover wall portions 132 are extended in the front-rear direction above the dust collector-side connecting part 142. An engagement element that is engaged with an engaging element provided in the power tool 10 is provided on an inner wall surface of each of the cover wall portions 132.

The dust box 121 is attached to the outer shell frame portion 130 in a detachable manner by a non-illustrated latch mechanism. As shown in FIG. 19, a filter unit 122 is provided inside of the dust box 121 to filter the dust sucked through the dust collecting flow path portion 110. The dust box 121 is configured to cause the air flowing therein through the dust collecting flow path portion 110 to pass through the filter unit 122 and flow to the rear extending portion 140 as shown by an arrow AF.

As shown in FIG. 19, a bottom face of the dust box 121 is aligned with a bottom face of the rear extending portion 140 in the front-rear direction to configure a bottom face portion 125 of the dust collector 100. The bottom face portion 125 of the dust collector 100 is configured such that the dust collector 100 is placed on a horizontal plane in a stable attitude.

An upper surface of the rear extending portion 140 forms an inclined surface 141. The upper surface of the rear extending portion 140 is inclined to the bottom face portion 125 and faces backward. As shown in FIG. 20, in assembly of the power tool system 200, the inclined surface 141 is opposed to the inclined bottom face 36 of the power tool 10.

Referring to FIG. 18 and FIG. 19, the inclined surface 141 of the rear extending portion 140 is provided with the dust collector-side connecting part 142, which connects with the connecting part 90 provided in the inclined bottom face 36 of the power tool 10. The dust collector-side connecting part 142 includes an exhaust opening 143 that is open at a center thereof, a pin 144 placed on a center axis of the exhaust opening 143 to be protruded upward, and a ring-shaped sealing member 145 placed around an outer periphery of the exhaust opening 143.

As shown in FIG. 19, a downstream-side connection flow path 146 is provided inside of the rear extending portion 140 to connect the dust box 121 with the exhaust opening 143. As described above, when the power tool 10 is attached to the dust collector 100, the pin 144 presses up the shutter member 94 of the connecting part 90 of the dust collector 100 to open the connection opening 93 of the connecting part 90. This causes the connection opening 93 of the dust collector 100 to communicate with the exhaust opening 143 of the dust collector 100. The inclined bottom face 36 of the power tool 10 compresses the sealing member 145 of the dust collector-side connecting part 142 to seal a flow path between the power tool 10 and the dust collector 100 in an air-tight manner. This configuration causes the air to be sucked from the dust collector 100 into the power tool 10 by the suction power generated by the second fan 75*b* in the power tool 10 and generates the suction power to suck the dust in the dust collector 100.

A pair of end walls 148 extended upward are provided at respective ends in the left-right direction of the rear extending portion 140. The pair of end walls 148 are configured to hold a front-side section of the lower end part 35 of the power tool 10 placed therebetween in the left-right direction in the state that the power tool system 200 is configured. The pair of end walls 148 serve as a positioning element for positioning the connecting part 90 of the power tool 10 when the connecting part 90 of the power tool 10 connects with the dust collector-side connecting part 142 of the dust collector 100. Engagement elements are provided on inner wall surfaces of the pair of end walls 148 to be engaged with side faces of the lower end part 35 of the power tool 10. The rear extending portion 140 is also provided with a latch mechanism to lock the attached power tool 10.

As shown in FIG. 17 and FIG. 19, the inclined surface 141 of the dust collector 100 is inclined to the bottom face portion 125, such as to be opposed to the inclined bottom face 36 of the power tool 10, when the dust collector 100 is attached to the power tool 10. The configuration of the dust collector 100 suppresses an increase in the overall height in the state that the dust collector 100 is attached to the power tool 10, and enables downsizing of the power tool system 200. This configuration accordingly enhances the usability and the ease of handling of the power tool system 200.

Referring to FIG. 22A, process of attaching the dust collector 100 to the power tool 10 is described. The power tool 10 and the dust collector 100 are configured to be slidingly movable and approachable to each other in a direction perpendicular to the inclined bottom face 36 of the power tool 10, so as to be integrally connected with each other. For example, a pair of rails for guiding the move of the power tool 10 in that direction are provided on inner wall surface of the pair of cover wall portions 132 provided on the rear side of the outer shell frame portion 130 of the dust collector 100 or of the pair of end walls 148 of the rear extending portion 140. This configuration further facilitates attachment of the dust collector 100 to the power tool 10. Furthermore, this configuration suppresses the seal pressure of the sealing member 145 of the dust collector-side connecting part 142 from becoming non-uniform, thus suppressing leakage of the air from the connecting part 90 and suppressing reduction of the suction power of the dust collector 100.

Referring to FIG. 20, the bottom face portion 125 of the dust collector 100 is at the lowest position in the power tool system 200. The power tool system 200 is configured to be placed on a horizontal plane in a stable attitude with the bottom face portion 125 thereof as a supporting surface in the state that the battery BT is not attached to the power tool 10, by adjusting the position of the center of gravity and the area of the bottom face portion 125. This configuration enables the power tool system 200 to be placed in a stable attitude even in the state that the battery BT is not mounted and thereby enhances the usability of the power tool system 200.

It is preferable that the power tool system 200 is configured to be placeable on a horizontal plane with being supported by the bottom face portion 125 of the dust collector 100 even in the state that the battery BT is mounted. In this case, when the bottom face of the battery BT is located at a higher position than the bottom face portion 125 of the dust collector 100, the power tool system 200 is placeable on the horizontal plane with the bottom face portion 125 as the supporting surface in the state that the battery BT is separated from the horizontal plane. When the bottom face of the battery BT is located at a lower position than the bottom face portion 125 of the dust collector 100, on the other hand, the power tool system 200 is placeable on the horizontal plane with being supported by a front end part of the bottom portion 125 and a front end part of the bottom face of the battery BT. When the bottom face of the battery BT is located at an identical height with the height of the bottom face portion 125 of the dust collector 100, the power tool system 200 is placeable on the horizontal plane with being supported by the bottom face portion 125 of the dust collector 100 and the bottom face of the battery BT.

The power tool system 200 of this configuration is placeable on a horizontal plane in a statable attitude in the state that the battery BT and the dust collector 100 are attached to the power tool 10. This configuration enables the power tool system 200 to be stably placed on a horizontal plane during the use of the power tool system 200 and further enhances the usability of the power tool system 200.

1-7. Conclusions

As described above, the configuration of the power tool 10 of the embodiment suppresses the first air flow Fa and the second air flow Fb from interfering with each other in the routes from the two fans 75*a* and 75*b* to the exhaust ports 74*a* and 74*b*. This configuration accordingly suppresses the effect of cooling down the motor 32 and suppresses reduction of the suction power of the dust collector caused by a pressure loss of the first air flow Fa and the second air flow Fb.

2. Other Embodiments

The technique of the present disclosure is not limited to the configuration of the embodiment described above or any of the configurations described above as other possible embodiments or configurations in the description of the embodiment. The configuration of the embodiment described above may be changed, modified or altered as described below. The configurations of embodiments described below should be regarded as some aspects of the technique of the present disclosure, like the configuration described in the above embodiment.

For example, the power tool 10 of the embodiment may have a configuration connected with an external power source by means of a cable to obtain the electric power, in place of the configuration of mounting the battery BT. the inclined bottom face 36 of the above embodiment may be configured to be inclined at an angle along the front-rear direction. The motor 32 may not be necessarily placed in such an attitude that the rotating shaft 32*x* thereof is orthogonal to the front-rear direction. The first fan 75*a* and the second fan 75*b* may not be necessarily integrated with each other.

3. Other Aspects

The technique of the present disclosure described in the above embodiment may be implemented by, for example, other aspects described below. The following describes other aspects of the technique of the present disclosure after description of the background of the other aspects.

Like the hammer drill of Patent Literature 1 described above, a battery configured to supply electric power to a motor and a dust collector configured to suck the dust generated in the course of processing operations may be attached to a power tool. U.S. Pat. No. 6,851,898 B2 (hereinafter referred to as "Patent Literature 2") discloses a dust collector that is attached to a power tool. Both the dust collectors disclosed in Patent Literature 1 and in Patent Literature 2 are attached from downward to a lower part of the power tool having a hammer mechanism and are configured to collect the dust by taking advantage of the suction power generated by the power tool.

As described above, the battery and the dust collector may be attached to the power tool. Improvements have been continually added to, for example, facilitate operations of attaching the foregoing and enhance the usability and the ease of handling after the attachment.

One aspect of the technique of the present disclosure has an object of providing a power tool that facilitates at least a mounting operation of a battery.

According to other aspects of the technique of the present disclosure, there are provided a power tool, a power tool system, and a dust collector.

Aspect A1:

An aspect A1 is provided as a power tool having a hammer mechanism. The power tool of the aspect A1 includes a tool holding portion, a motor housing portion, and a battery mounting portion. The tool holding portion is extended in a front-rear direction and a tip tool configured to move back and forth in the front-rear direction is mounted to a tip end of the tool holding portion. The motor housing portion is extended downward from the tool holding portion and a motor configured to drive the tip tool is placed inside the motor housing portion in such an attitude that a rotating shaft of the motor intersects with the front-rear direction. The battery mounting portion is located on a rear side of the motor housing portion. The battery mounting portion is provided on a rear bottom face that faces downward. A battery configured to supply electric power to the motor is attached to the battery mounting portion. The motor housing portion includes an inclined bottom face that is placed on a front side of the battery mounting portion, that is extended downward from the motor housing portion to be lower than the rear bottom face, and that is inclined relative to the front-rear direction to face forward.

According to the power tool of the aspect A1, the battery mounting portion on the rear side is lifted upward from a horizontal plane when the inclined bottom face is placed on the horizontal plane. Therefore, the battery can be easily mounted to the power tool.

Aspect A2:

The power tool described in the above aspect A1 may be configured to be placeable on a horizontal plane with the inclined bottom face as a supporting surface.

According to the power tool of this aspect A2, the height of a housing can be reduced compared with a configuration that the rotating shaft of the motor is placed to be orthogonal to the front-rear direction. So, this configuration enables downsizing of the power tool and facilitates the handling of the power tool.

Aspect A3:

In the power tool described in either the above aspect A1 or the above aspect A2, the rotating shaft of the motor may be placed at an angle obliquely intersecting with the front-rear direction.

The power tool of this aspect A3 allows for reduction in the height of a housing, compared with a configuration that the rotating shaft of the motor is placed to be orthogonal to the front-rear direction. This configuration enables downsizing of the power tool and facilitates the handling of the power tool.

Aspect A4:

In the power tool described in the above aspect A3, the inclined bottom face may be perpendicular to an axial direction of the rotating shaft.

According to the power tool of this aspect A4, a dead space around a lower end part of the rotating shaft of the motor is suppressed to form. This configuration accordingly improves the space efficiency in the housing of the power tool and enables downsizing of the power tool.

Aspect A5:

In the power tool described in any of the above aspect A1 to the above aspect A4, the inclined bottom face may be provided with a connecting part that is connected with a dust collector, which is attached to the power tool to be integrated therewith and which is configured to suck dust generated during processing of an object material to be processed by using the tip tool.

According to the power tool of this aspect A5, a space where a dust collector-side connecting part is placed therein is formed below the inclined bottom face, when the power tool is in an orientation that the front-rear direction is a horizontal direction. This configuration suppresses an increase in height dimension when the power tool is integrated with the dust collector.

Aspect A6:

In the power tool described in the above aspect A5, the dust collector may be configured to collect the dust by means of suction power generated by the power tool. A fan configured to generate the suction power may be connected with the rotating shaft of the motor. The connecting part may include a connection flow path configured to suck the air from the dust collector by the suction power generated by the fan.

According to the power tool of this aspect A6, a distance between the fan configured to generate the suction power for dust collection and the connection flow path can be shortened. This configuration enables the suction power generated by the power tool to be efficiently transmitted to the dust collector and thereby enhances the suction performance of the dust collector.

Aspect A7:

An aspect A7 is provided as a power tool system. The power tool system of the aspect A7 comprises the power tool described in the above aspect A5 or in the above aspect A6 and the dust collector. The power tool and the dust collector may be configured to be slidingly movable and approachable to each other in a direction perpendicular to the inclined bottom face, so as to be integrally connected with each other.

According to the power tool system of this aspect A7, the dust collector can be attached to the power tool more easily. In the case where a sealing member is placed around the connecting part, this configuration suppresses the seal pressure of the sealing member from becoming non-uniform.

Aspect A8:

An aspect A8 is provided as a power tool system. The power tool system of the aspect A8 comprises the power tool described in the above aspect A5 or in the above aspect A6 and the dust collector. The power tool system may be configured to be placeable on a horizontal plane with a bottom face portion of the dust collector as a supporting surface in a state where the dust collector is attached to the power tool.

According to the power tool system of this aspect A8, placement on the horizontal plane in a stable attitude in the state where the dust collector is attached to the power tool is achieved. Accordingly, the usability of the power tool system is enhanced.

Aspect A9:

The power tool system described in the above aspect A8 may be configured to be placeable on the horizontal plane with being supported by the bottom face portion of the dust collector in a state where the battery and the dust collector are attached to the power tool.

According to the power tool system of this aspect A9, placement on the horizontal plane in a stable attitude in a state that the battery and the dust collector are attached to the power tool is achieved. Accordingly, the usability of the power tool system is further enhanced.

Aspect A10:

An aspect A10 is provided as a dust collector that is attached to the power tool described in the above aspect A5 or in the above aspect A6 to be integrated therewith and that is configured to suck dust generated during processing of an object material to be processed by using the tip tool. The dust collector of the aspect A10 includes a bottom face portion, an inclined surface, and a dust collector-side connecting part. The bottom face portion is configured to be placeable on a horizontal plane. The inclined surface is inclined relative to the bottom face portion and is opposed to the inclined bottom face when the dust collector is attached to the power tool. The dust collector-side connecting part is provided on the inclined surface and is to be connected with the connecting part of the power tool.

According to the dust collector of this aspect A10, overall height in the state that the dust collector is attached to the power tool can be suppressed to increase.

The configuration of the embodiment described above may be changed, modified or altered, for example, as described below, in the other aspects of the technique of the present disclosure described above. The configuration of the embodiment described below should be regarded as one aspect of the technique of the present disclosure, like the configuration described in the above embodiment.

The inclined bottom face 36 of the above embodiment may be applied to a power tool having a different configuration from that of the power tool described in the above embodiment. For example, the inclined bottom face 36 may be applied to a power tool that does not have a configuration corresponding to the air flow generator 70 or may be applied to a power tool that does not have a configuration for mounting the dust collector.

DESCRIPTION OF THE NUMERALS

10: power tool, 11: housing, 11*s*: inner wall surface, 11*w*: inner wall portion, 20: front main body, 21: tool holding portion, 22: tool mounting portion, 23: upper face intake port, 24: side handle, 25: dial operation unit, 26: change speed switch, 30: motor housing portion, 32: motor, 32*r*: rotor, 32*s*: stator, 32*x*: rotating shaft, 33*a*: first end part, 33*b*: second end part, 35: lower end part, 36: inclined bottom face, 40: rear main body, 41: grip portion, 42: controller housing portion, 43: pivotal rotation axis, 44: elastic member, 45: trigger, 45*c*: switch circuit, 46: controller, 47: rear bottom face, 47*s*: step portion, 48: battery mounting portion, 48*e*: engagement element, 48*r*: guide rail, 48*t*: connection terminal, 50: drive unit, 51: driving mechanism 52: driving force transmission mechanism, 53: intermediate rotating shaft, 54: bevel gear, 55: swinging member, 55*a*: base end part, 55*b*: swinging lever, 56: speed reducer, 60: tool driving mechanism, 61: tool holding member, 62: piston cylinder, 63: air chamber, 64: striker, 65: impact bolt, 70: air flow generator, 71: fan housing chamber, 71*a*: first fan chamber, 71*b*: second fan chamber, 71*c*: exhaust chamber, 71*c*A: first exhaust area, 71*c*B: second exhaust area, 72: inlet opening, 73: bottom face opening, 74*a*: first exhaust port, 74*b*: second exhaust port, 74*c*: third exhaust port, 75*a*: first fan, 75*b*: second fan, 75*w*: double fan, 76*a*: fin, 76*b*: fin, 77: inlet port, 78L: lower wall portion, 78M: middle wall portion, 78*e*: flange portion, 80: baffle plate, 81: center plat portion, 81*a*: first part, 81*b*: second part, 82: side wall portion, 82*a*: first wall surface, 82*a*: wall surface, 82*b*: second wall surface, 83: center opening, 84: convex rib, 85: cylindrical portion, 86: rib, 90: connecting part, 91: cap member, 92*c*: outer peripheral cylindrical portion, 92*w*: bottom wall portion, 93: connection opening, 94: shutter member, 94*r*: reinforcing rib, 95: biasing member, 96: connection flow path, 98*a*: first exhaust flow path, 98*b*: second exhaust flow path, 100: dust collector, 110: dust collecting flow path portion, 111: suction flow path, 112: nozzle portion, 113: insertion port, 114: dust collecting intake port, 120: dust collecting portion, 121: dust box, 122: filter unit, 125: bottom face portion, 130: outer shell frame portion, 131: upstream-side connection flow path, 132: cover wall portion, 140: rear extending portion, 141: inclined surface, 142: dust collector-side connecting part, 143: exhaust opening, 144: pin, 145: sealing member, 146: downstream-side connection flow path, 148: end wall, 200: power tool system, HP: horizontal plane, TT: tip tool, BT: battery, Fa: first air flow, Fb: second air flow, rx: virtual axis

What is claimed is:

1. A power tool having a hammer mechanism, comprising:

a tool mounting portion which a tip tool is mounted to;

a connecting part configured to be connectable with a dust collector that is configured to suck dust generated during processing of an object material to be processed by using the tip tool, and provided with a connection flow path configured to suck in the air from the dust collector, so as to generate a suction power in the dust collector;

a motor provided with a rotating shaft;

a driving mechanism connected with a first end part of the rotating shaft and configured to convert a rotational motion of the rotating shaft into a reciprocating motion and transmit the reciprocating motion to the tip tool;

a first fan connected with a second end part of the rotating shaft and configured to rotate with the rotating shaft and blow the air in a centrifugal direction, so as to generate a first air flow that serves to cool down the motor;

a second fan stacked on the first fan via a middle wall in an axial direction of the rotating shaft and configured to rotate with the first fan and blow the air in the centrifugal direction, so as to generate a second air flow that serves to generate the suction power;

a housing provided with a first exhaust port configured to discharge the first air flow therethrough and a second exhaust port configured to discharge the second air flow therethrough;

a first exhaust flow path configured to guide the first air flow to the first exhaust port; and a second exhaust flow path separated from the first exhaust flow path and configured to guide the second air flow to the second exhaust port.

2. The power tool according to claim 1, further comprising:

a baffle plate placed at a position on an opposite side to the first fan across the second fan to be laid in the axial direction of the rotating shaft and configured to rectify the air flow blown in the centrifugal direction by the second fan, wherein part of the baffle plate forms a partition wall that separates the first exhaust flow path and the second exhaust flow path from each other.

3. The power tool according to claim 2, wherein the second exhaust port is provided at a position facing the baffle plate, and a rib configured to divide the second exhaust port into a plurality of areas is formed on a second exhaust port-side face of the baffle plate.

4. The power tool according to claim 2, wherein the baffle plate includes a center plate portion arranged to intersect with a center axis of the second fan and placed along the centrifugal direction of the second fan, wherein the center plate portion includes a first part that is a continuous part having an end portion thereof located on an outer side of an end portion of the second fan in the centrifugal direction of the second fan, and a second part having an end portion thereof located at a position closer to the center axis of the second fan than the end portion of the first part.

5. The power tool according to claim 2, wherein the first fan and the second fan have configurations different from each other.

6. The power tool according to claim 5, wherein the first fan is provided with a plurality of fins on a motor-side face thereof and is configured to take in the air from a motor side in a direction of the rotating shaft and blow the air in the centrifugal direction, and the second fan is provided with an air inlet port provided in a center portion thereof and with a plurality of fins arranged around the intake port and configured to blow the air, which is taken in through the inlet port, in the centrifugal direction.

7. The power tool according to claim 2, wherein the middle wall portion is provided with a circular flange portion arranged around an outer circumferential part of the middle wall portion and protruded in the centrifugal direction more than an outer circumferential end of the first fan and an outer circumferential end of the second fan.

8. The power tool according to claim 2, wherein the first exhaust port and the second exhaust port are arranged together in an end part of the housing in a direction from the first end part of the rotating shaft toward the second end part of the rotating shaft, and are configured to discharge at least part of the first air flow and the second air flow in an identical direction.

9. The power tool according to claim 2, wherein at least one of the first exhaust port and the second exhaust port is configured to discharge the air in a plurality of directions.

10. The power tool according to claim 2, wherein the baffle plate includes a side wall portion that is extended in the axial direction of the rotating shaft on a lateral side of the second fan, wherein the side wall portion includes a first wall surface arranged to face the first exhaust flow path, along with an inner wall surface of the housing; and a second wall surface arranged to face the second exhaust flow path, along with the inner wall surface of the housing.

11. The power tool according to claim 10, wherein the baffle plate includes a center plate portion arranged to intersect with a center axis of the second fan and placed along the centrifugal direction of the second fan, wherein the center plate portion includes a first part that is a continuous part having an end portion thereof located on an outer side of an end portion of the second fan in the centrifugal direction of the second fan, and a second part having an end portion thereof located at a position closer to the center axis of the second fan than the end portion of the first part.

12. The power tool according to claim 11, wherein the side wall portion is formed on an opposite side to the second part across the center axis of the second fan in the centrifugal direction of the second fan.

13. The power tool according to claim 12, wherein the second exhaust port is provided at a position facing the baffle plate, and a rib configured to divide the second exhaust port into a plurality of areas is formed on a second exhaust port-side face of the baffle plate.

14. The power tool according to claim 1, wherein the first fan and the second fan have configurations different from each other.

15. The power tool according to claim 14, wherein the first fan is provided with a plurality of fins on a motor-side face thereof and is configured to take in the air from a motor side in a direction of the rotating shaft and blow the air in the centrifugal direction, and the second fan is provided with an air inlet port provided in a center portion thereof and with a plurality of fins arranged around the intake port and configured to blow the air, which is taken in through the inlet port, in the centrifugal direction.

16. The power tool according to claim 1, wherein the middle wall portion is provided with a circular flange portion arranged around an outer circumferential part of the middle wall portion and protruded in the centrifugal direction more than an outer circumferential end of the first fan and an outer circumferential end of the second fan.

17. The power tool according to claim 1, wherein the first exhaust port and the second exhaust port are arranged together in an end part of the housing in a direction from the first end part of the rotating shaft toward the second end part of the rotating shaft, and are configured to discharge at least part of the first air flow and the second air flow in an identical direction.

18. The power tool according to claim 1, wherein at least one of the first exhaust port and the second exhaust port is configured to discharge the air in a plurality of directions.

* * * * *